United States Patent
Zhao et al.

(10) Patent No.: US 11,490,092 B2
(45) Date of Patent: Nov. 1, 2022

(54) EVENT-BASED ADAPTATION OF CODING PARAMETERS FOR VIDEO IMAGE ENCODING

(71) Applicant: Huawei Technologies Co., Ltd., Shenzhen (CN)

(72) Inventors: Zhijie Zhao, Munich (DE); Yuntan Fang, Beijing (CN); Jun Zha, Shenzhen (CN); Hu Chen, Munich (DE); Jiantong Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/170,122

(22) Filed: Feb. 8, 2021

(65) Prior Publication Data

US 2021/0168372 A1 Jun. 3, 2021

Related U.S. Application Data

(63) Continuation of application No. PCT/CN2018/100332, filed on Aug. 14, 2018.

(51) Int. Cl.
 *H04N 19/176* (2014.01)
 *H04N 19/137* (2014.01)
 (Continued)

(52) U.S. Cl.
 CPC ......... *H04N 19/137* (2014.11); *H04N 7/0127* (2013.01); *H04N 19/132* (2014.11);
 (Continued)

(58) Field of Classification Search
 CPC .. H04N 19/137; H04N 19/132; H04N 19/167; H04N 19/176; H04N 7/0127
 See application file for complete search history.

(56) References Cited

U.S. PATENT DOCUMENTS 9,817,507 B2    11/2017  Park et al.
2010/0182468 A1*  7/2010  Posch ................ H04N 3/155
                                                    348/294

(Continued)

FOREIGN PATENT DOCUMENTS

CN    101184221 A    5/2008
CN    101494718 A    7/2009

(Continued)

OTHER PUBLICATIONS

Brandli, C. et al., "A 240 X 180 130 dB 3 µs Latency Global Shutter Spatiotemporal Vision Sensor", IEEE Journal of Solid-State Circuits, vol. 49, No. 10, Oct. 2014, pp. 2333-2341. (Year: 2014).*

(Continued)

*Primary Examiner* — Hesham K Abouzahra
(74) *Attorney, Agent, or Firm* — Slater Matsil, LLP

(57) ABSTRACT

The present disclosure relates to encoding of video image using coding parameters, which are adapted based on events related to motion within the video image. Image content is captured by a standard image sensor and an event-triggered sensor, providing an event-signal indicating changes (e.g. amount and time-spatial location) of image intensity. Objects are detected within the video image, based on the event signal assessing motion of the object, and their textures extracted. The spatial-time coding parameters of the video image are determined based on the location and strength of the event signal, and the extent to which the detected objects moves.

16 Claims, 15 Drawing Sheets

(51) Int. Cl.
*H04N 19/132* (2014.01)
*H04N 19/167* (2014.01)
*H04N 7/01* (2006.01)
*H04N 19/31* (2014.01)
*H04N 19/33* (2014.01)
*H04N 5/335* (2011.01)

(52) U.S. Cl.
CPC ......... *H04N 19/167* (2014.11); *H04N 19/176* (2014.11); *H04N 5/335* (2013.01); *H04N 19/31* (2014.11); *H04N 19/33* (2014.11)

(56) References Cited

U.S. PATENT DOCUMENTS

2014/0204995 A1 7/2014 Dzik
2019/0007678 A1* 1/2019 Perez-Ramirez .... H04N 19/167

FOREIGN PATENT DOCUMENTS

| CN | 103297754 A | 9/2013 |
| EP | 2977931 A1 | 1/2016 |
| JP | H02112394 A | 4/1990 |

OTHER PUBLICATIONS

Takagi, M. et al., "Optimized Spatial and Temporal Resolution Based on Subjective Quality Estimation without Encoding", 2014 IEEE Visual Communications and Image Processing Conference, Mar. 2, 2015, pp. 33-36.
Brandli, C. et al., "A 240 X 180 130 dB 3 µs Latency Global Shutter Spatiotemporal Vision Sensor", IEEE Journal of Solid-State Circuits, vol. 49, No. 10, Oct. 2014, pp. 2333-2341.

* cited by examiner

EVENT-BASED ADAPTATION OF CODING PARAMETERS FOR VIDEO IMAGE ENCODING

CROSS-REFERENCE TO RELATED APPLICATIONS

This application is a continuation of International Application No. PCT/CN2018/100332, filed on Aug. 14, 2018, the disclosure of which is hereby incorporated by reference in its entirety.

TECHNICAL FIELD

The present disclosure relates to encoding of video images using coding parameters.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

Since the development of the block-based hybrid video coding approach in the H.261 standard in 1990, new video coding techniques and tools were developed and formed the basis for new video coding standards. One of the goals of most of the video coding standards was to achieve a bitrate reduction compared to its predecessor without sacrificing picture quality. Further video coding standards comprise MPEG-1 video, MPEG-2 video, ITU-T H.262/MPEG-2, ITU-T H.263, ITU-T H.264/MPEG-4, Part 10, Advanced Video Coding (AVC), ITU-T H.265, High Efficiency Video Coding (HEVC), and extensions, e.g. scalability and/or three-dimensional (3D) extensions, of these standards.

In some current video encoders and decoders such as H.264/AVC or HEVC (H.265) or next generations, the coding parameters, for example, frame rate, picture size or quantization parameter QP; used for video image encoding are often preset (for instance by a user or an application using the encoder) and indicated to the encoder. However, a key problem in computer vision devices and application, such as video surveillance applications, is how to determine these coding parameters for an optimized performance.

SUMMARY

For computer vision applications, it is therefore desired to control the rate for image/video encoding and decoding, depending on the specific application. Exploiting events, i.e. event signals provided by event-driven cameras, may be suitable in particular for controlling the image/video coding rate.

Embodiments of the invention are defined by the features of the independent claims, and further advantageous implementations of the embodiments by the features of the dependent claims.

According to an aspect of the present disclosure, an apparatus is provided for encoding samples of a video image comprising a processing circuitry configured to obtain the video image from an image sensor; to obtain, from an event-triggered sensor, an event signal indicating location of image intensity change; to determine a coding parameter for encoding the video image according to the obtained event signal; and to encode the video image by applying the determined coding parameter.

This may provide the advantage of determining coding parameters for encoding video images with a higher accuracy by combining low-spatial resolution dynamic image characteristics with high-spatial resolution video image.

According to an aspect of the present disclosure, the event-signal further indicates, for the respective location, an amount of the image intensity change.

According to an aspect of the present disclosure, the processing circuitry of the apparatus is further configured to determine, based on the event signal, motion information, indicating motion of an object in the video image; and to detect, based on the motion information, an object at a location within the video image in correspondence to the locations of the image intensity change.

For instance, the object is detected, when the motion information is equal to or larger than a first predetermined threshold.

This may provide the advantage of a fast and reliable detection of an object in the video image using event signals as dynamic characteristics. In particular, fast moving objects in the video image are detected accurately.

According to an aspect of the disclosure, the motion information is calculated using a metric of the image intensity change.

According to an aspect of the present disclosure, the processing circuitry is configured to determine the coding parameter related to time resolution or spatial resolution of the video image according to the calculated motion information and/or the detected object.

This may provide the advantage of facilitating the spatial and temporal adaptation of the coding parameters using both dynamic image characteristics via the motion information and knowledge of detected objects.

For instance, the coding parameter is any of frame rate, picture size, or quantization parameter, QP.

According to an aspect of the present disclosure, the processing circuitry is configured to retain, when the object is detected and is moving with a speed at or below a predetermined speed threshold, the frame rate and picture size each with reference to a default value; to increase, when the object is detected and is moving with a speed larger than the speed threshold, the frame rate with reference to the default value; and to decrease, when no object is detected, the frame rate and picture size each with reference to the default value.

The combined use of whether or not an object is detected and how fast the object moves may provide the advantage of performing coding parameter adaptation, which is optimized for particular regions within the video image. The results may be an optimal encoded video image. This may further provide the advantage of improving the speed and accuracy, for example, of machine vision systems, which rely on (optimal) encoded video images.

According to an aspect of the present disclosure, the processing circuitry is further configured to determine, based on the event signal, a region of interest, ROI, and a region of non-interest, RONI, within the video image; to determine, according to the ROI and the RONI, for each region the respective coding parameter for coding the samples within the ROI and the RONI; and to encode the samples within the ROI and the RONI by applying the respective coding parameter.

According to an aspect of the present disclosure, the processing circuitry is further configured to detect the ROI and the RONI, corresponding to a ROI-RONI bitmap with bits per unit and unit corresponding to one or more samples, by comparing, for each event signal, an absolute value of the image intensity change with a second predefined threshold; setting, when the absolute value is equal to or larger than the second predetermined threshold, the respective value to one, and otherwise zero; associating the value one within the ROI and the value zero outside the ROI, corresponding to the RONI; marking, in correspondence to the location of the image intensity change based on the set value one, the sample of the video image as part of the object; and to encode the ROI and the RONI.

In one exemplary implementation, the object is detected within the video image, based on the calculated motion information and the detected ROI, by mapping the ROI-RONI bitmap onto the video image, so as to match locations of the samples of the video image.

The use of the ROI-RONI map and the motion information may provide the advantage of a fast and more reliable detection of an object and the region in which it is located within the video image.

According to an aspect of the present disclosure, the coding parameter QP for a coding block of the video image, is determined by decreasing the QP, when a part or the entire coding block is within the ROI and/or the object is detected; and increasing the QP, when the coding block is within the RONI.

According to one exemplary implementation, the apparatus comprises further a processing circuitry, configured to extract a feature of the detected object; determine a coding parameter according to the extracted feature; and encode the feature by applying the coding parameter.

The account of features of the event-based detected object by a feature-specific coding parameter may provide the advantage of improving further the set of coding parameters, used for encoding the video image.

According to an aspect of the present disclosure, the location of the intensity change is mapped onto a location of the sample, corresponding to a coordinate of the sample in the video image.

According to an aspect of the present disclosure, a method is provided for encoding samples of a video image comprising the steps of obtaining the video image from an image sensor; obtaining, from an event-triggered sensor, an event signal indicating location of image intensity change; determining a coding parameter for encoding the video image according to the obtained event signal; and encoding the video image by applying the determined coding parameter.

According to an aspect of the present disclosure, the method steps include further determining, based on the event signal, motion information, indicating motion of an object in the video image; and detecting, based on the motion information, an object at a location within the video image in correspondence to the locations of the image intensity change.

For instance, detecting of the object is concluded, when the motion information is equal to or larger than a first predetermined threshold.

According to an aspect of the present disclosure, wherein in the calculating step of the motion information a metric of the image intensity change is used.

According to an aspect of the present disclosure, the method steps include determining the coding parameter related to time resolution or spatial resolution of the video image according to the calculated motion information and/or the detected object.

According to an aspect of the present disclosure, the method steps include retaining, when the object is detected and is moving with a speed at or below a predetermined speed threshold, the frame rate and picture size each with reference to a default value; increasing, when the object is detected and is moving with a speed larger than the speed threshold, the frame rate with reference to the default value; and decreasing, when no object is detected, the frame rate and picture size each with reference to the default value.

According to an aspect of the present disclosure, the method steps include determining, based on the event signal, a region of interest, ROI, and a region of non-interest, RONI, within the video image; determining, according to the ROI and the RONI, for each region the respective coding parameter for coding the samples within the ROI and the RONI; and encoding the samples within the ROI and the RONI by applying the respective coding parameter.

According to an aspect of the present disclosure, the method steps include detecting the ROI and the RONI, corresponding to a ROI-RONI bitmap with bits per unit and unit corresponding to one or more samples, by comparing, for each event signal, an absolute value of the image intensity change with a second predefined threshold; setting, when the absolute value is equal to or larger than the second predetermined threshold, the respective value to one, and otherwise zero; associating the value one within the ROI and the value zero outside the ROI, corresponding to the RONI; marking, in correspondence to the location of the image intensity change based on the set value one, the sample of the video image as part of the object; and encoding the ROI and the RONI.

According to an aspect of the present disclosure, the method step for detecting an object within the video image, based on the calculated motion information and the detected ROI, includes mapping the ROI-RONI bitmap onto the video image, so as to match locations of the samples of the video image.

According to an aspect of the present disclosure, the method steps for determining the coding parameter QP for a coding block of the video image include decreasing the QP, when a part or the entire coding block is within the ROI and/or the object is detected; increasing the QP, when the coding block is within the RONI.

According to an aspect of the present disclosure, the method steps include extracting a feature of the detected object; determining a coding parameter according to the extracted feature; encoding the feature by applying the coding parameter.

According to an aspect of the present disclosure, the method steps include mapping the location of the intensity change onto a location of the sample, corresponding to a coordinate of the sample in the video image.

According to an aspect of the present disclosure, a computer-readable non-transitory medium is provided for storing a program, including instructions which when executed on a processor cause the processor to perform the steps of the method for encoding samples of a video image.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the invention are described in more detail with reference to the attached figures and drawings, in which.

Figure 1:
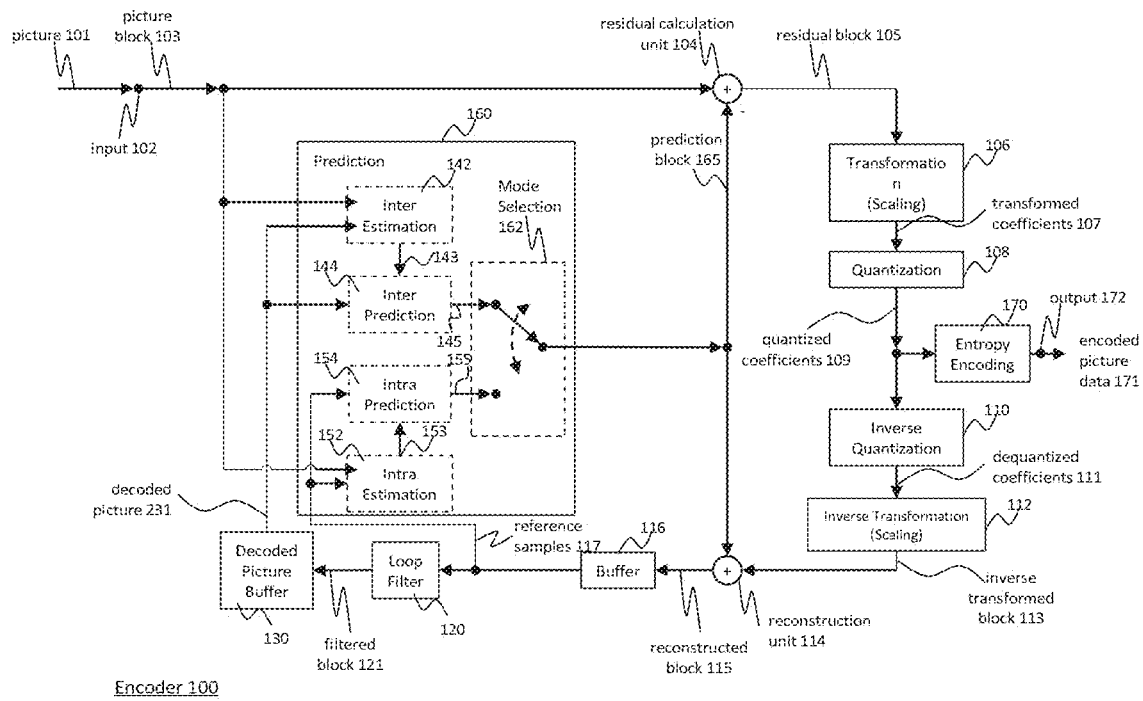
FIG. 1 is a block diagram showing an example of a video encoder configured to implement embodiments of the invention.

In the following, identical reference signs refer to identical or at least functionally equivalent features.

DETAILED DESCRIPTION OF ILLUSTRATIVE EMBODIMENTS

In the following description, reference is made to the accompanying figures, which form part of the disclosure, and which show, by way of illustration, specific aspects of embodiments or specific aspects in which the embodiments may be used. It is understood that embodiments may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term picture the terms frame or image may be used as synonyms in the field of video coding. Video coding comprises two parts, video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general, as will be explained later) shall be understood to relate to both, "encoding" and "decoding" of video pictures. The combination of the encoding part and the decoding part is also referred to as CODEC (COding and DECoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards since H.261 belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

As video picture processing (also referred to as moving picture processing) and still picture processing (the term processing comprising coding), share many concepts and technologies or tools, in the following the term "picture" is used to refer to a video picture of a video sequence (as explained above) and/or to a still picture to avoid unnecessary repetitions and distinctions between video pictures and still pictures, where not necessary. In case the description refers to still pictures (or still images) only, the term "still picture" shall be used.

In the following, embodiments of an encoder 100, a decoder 200 and a coding system 300 are described based on FIGS. 1 to 3.

Figure 3:
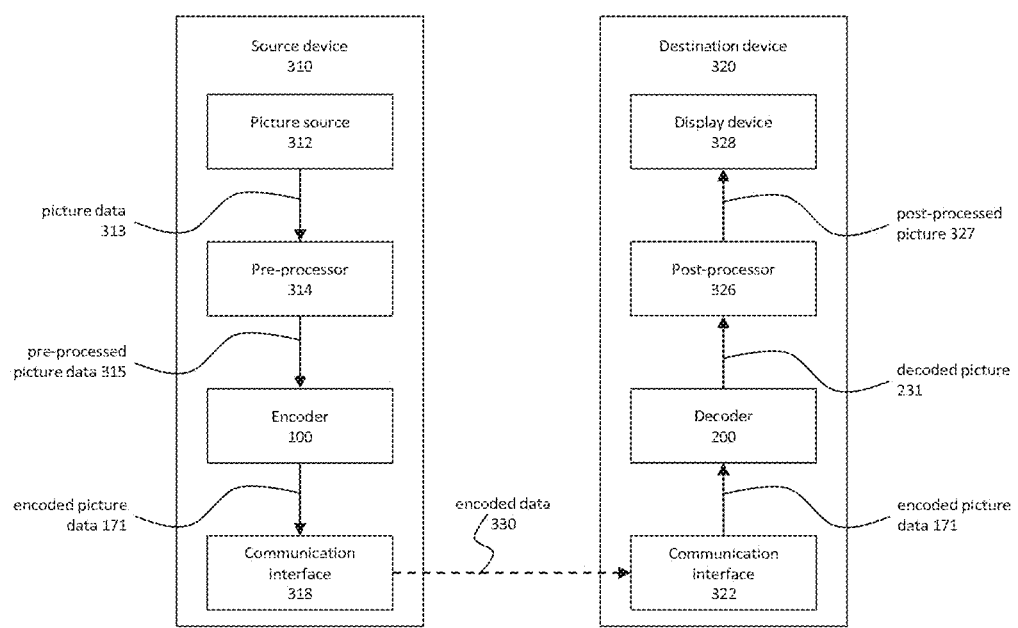
FIG. 3 is a block diagram showing an example of a video coding system configured to implement embodiments of the invention.

FIG. 3 is a schematic block diagram illustrating an embodiment of a coding system 300, e.g. a picture coding system 300, wherein the coding system 300 comprises a source device 310 configured to provide encoded data 330, e.g. an encoded picture 330, e.g. to a destination device 320 for decoding the encoded data 330.

The source device 310 comprises an encoder 100 or encoding unit 100, and may additionally, i.e. optionally, comprise a picture source 312, a pre-processing unit 314, e.g. a picture pre-processing unit 314, and a communication interface or communication unit 318.

The picture source 312 may comprise or be any kind of picture capturing device, for example for capturing a real-world picture, and/or any kind of a picture generating device, for example a computer-graphics processor for generating a computer animated picture, or any kind of device for obtaining and/or providing a real-world picture, a computer animated picture (e.g. a screen content, a virtual reality (VR) picture) and/or any combination thereof (e.g. an augmented reality (AR) picture). In the following, all these kinds of pictures and any other kind of picture will be referred to as "picture", unless specifically described otherwise, while the previous explanations with regard to the term "picture" covering "video pictures" and "still pictures" still hold true, unless explicitly specified differently.

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance/chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

The picture source 312 may be, for example a camera for capturing a picture, a memory, e.g. a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g. integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g. a wired or wireless interface, an optical interface, according to any proprietary or standardized interface protocol. The interface for obtaining the picture data 312 may be the same interface as or a part of the communication interface 318.

In distinction to the pre-processing unit 314 and the processing performed by the pre-processing unit 314, the picture or picture data 313 may also be referred to as raw picture or raw picture data 313.

Pre-processing unit 314 is configured to receive the (raw) picture data 313 and to perform pre-processing on the picture data 313 to obtain a pre-processed picture 315 or pre-processed picture data 315. Pre-processing performed by the pre-processing unit 314 may, e.g., comprise trimming, color format conversion (e.g. from RGB to YCbCr), color correction, or de-noising.

The encoder 100 is configured to receive the pre-processed picture data 315 and provide encoded picture data 171 (further details will be described, e.g., based on FIG. 1).

Communication interface 318 of the source device 310 may be configured to receive the encoded picture data 171 and to directly transmit it to another device, e.g. the destination device 320 or any other device, for storage or direct reconstruction, or to process the encoded picture data 171 for respectively before storing the encoded data 330 and/or transmitting the encoded data 330 to another device, e.g. the destination device 320 or any other device for decoding or storing.

The destination device 320 comprises a decoder 200 or decoding unit 200, and may additionally, i.e. optionally, comprise a communication interface or communication unit 322, a post-processing unit 326 and a display device 328.

The communication interface 322 of the destination device 320 is configured receive the encoded picture data 171 or the encoded data 330, e.g. directly from the source device 310 or from any other source, e.g. a memory, e.g. an encoded picture data memory.

The communication interface 318 and the communication interface 322 may be configured to transmit respectively receive the encoded picture data 171 or encoded data 330 via a direct communication link between the source device 310 and the destination device 320, e.g. a direct wired or wireless connection, or via any kind of network, e.g. a wired or wireless network or any combination thereof, or any kind of private and public network, or any kind of combination thereof.

The communication interface 318 may be, e.g., configured to package the encoded picture data 171 into an appropriate format, e.g. packets, for transmission over a communication link or communication network, and may further comprise data loss protection and data loss recovery.

The communication interface 322, forming the counterpart of the communication interface 318, may be, e.g., configured to de-package the encoded data 330 to obtain the encoded picture data 171 and may further be configured to perform data loss protection and data loss recovery, e.g. comprising error concealment.

Both, communication interface 318 and communication interface 322 may be configured as unidirectional communication interfaces as indicated by the arrow for the encoded picture data 330 in FIG. 3 pointing from the source device 310 to the destination device 320, or bi-directional communication interfaces, and may be configured, e.g. to send and receive messages, e.g. to set up a connection, to acknowledge and/or re-send lost or delayed data including picture data, and exchange any other information related to the communication link and/or data transmission, e.g. encoded picture data transmission.

The decoder 200 is configured to receive the encoded picture data 171 and provide decoded picture data 231 or a decoded picture 231 (further details will be described, e.g., based on FIG. 2).

The post-processor 326 of destination device 320 is configured to post-process the decoded picture data 231, e.g. the decoded picture 231, to obtain post-processed picture data 327, e.g. a post-processed picture 327. The post-processing performed by the post-processing unit 326 may comprise, e.g. color format conversion (e.g. from YCbCr to RGB), color correction, trimming, or re-sampling, or any other processing, e.g. for preparing the decoded picture data 231 for display, e.g. by display device 328.

The display device 328 of the destination device 320 is configured to receive the post-processed picture data 327 for displaying the picture, e.g. to a user or viewer. The display device 328 may be or comprise any kind of display for representing the reconstructed picture, e.g. an integrated or external display or monitor. The displays may, e.g. comprise cathode ray tubes (CRT), liquid crystal displays (LCD), plasma displays, organic light emitting diodes (OLED) displays or any kind of other display, such as beamer, hologram (3D), or the like.

Although FIG. 3 depicts the source device 310 and the destination device 320 as separate devices, embodiments of devices may also comprise both or both functionalities, the source device 310 or corresponding functionality and the destination device 320 or corresponding functionality. In such embodiments the source device 310 or corresponding functionality and the destination device 320 or corresponding functionality may be implemented using the same hardware and/or software or by separate hardware and/or software or any combination thereof.

As will be apparent for the skilled person based on the description, the existence and (exact) split of functionalities of the different units or functionalities within the source device 310 and/or destination device 320 as shown in FIG. 3 may vary depending on the actual device and application.

Therefore, the source device 310 and the destination device 320 as shown in FIG. 3 are just example embodiments and embodiments are not limited to those shown in FIG. 3.

Source device 310 and destination device 320 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices, broadcast receiver device, or the like and may use no or any kind of operating system.

Encoder and Encoding Method

FIG. 1 shows a schematic/conceptual block diagram of an embodiment of an encoder 100, e.g. a picture encoder 100, which comprises an input 102, a residual calculation unit 104, a transformation unit 106, a quantization unit 108, an inverse quantization unit 110, and inverse transformation unit 112, a reconstruction unit 114, a buffer 118, a loop filter 120, a decoded picture buffer (DPB) 130, a prediction unit 160, an inter estimation unit 142, an inter prediction unit 144, an intra-estimation unit 152, an intra-prediction unit 154, a mode selection unit 162, an entropy encoding unit 170, and an output 172. A video encoder 100 as shown in FIG. 1 may also be referred to as hybrid video encoder or a video encoder according to a hybrid video codec.

Figure 2:
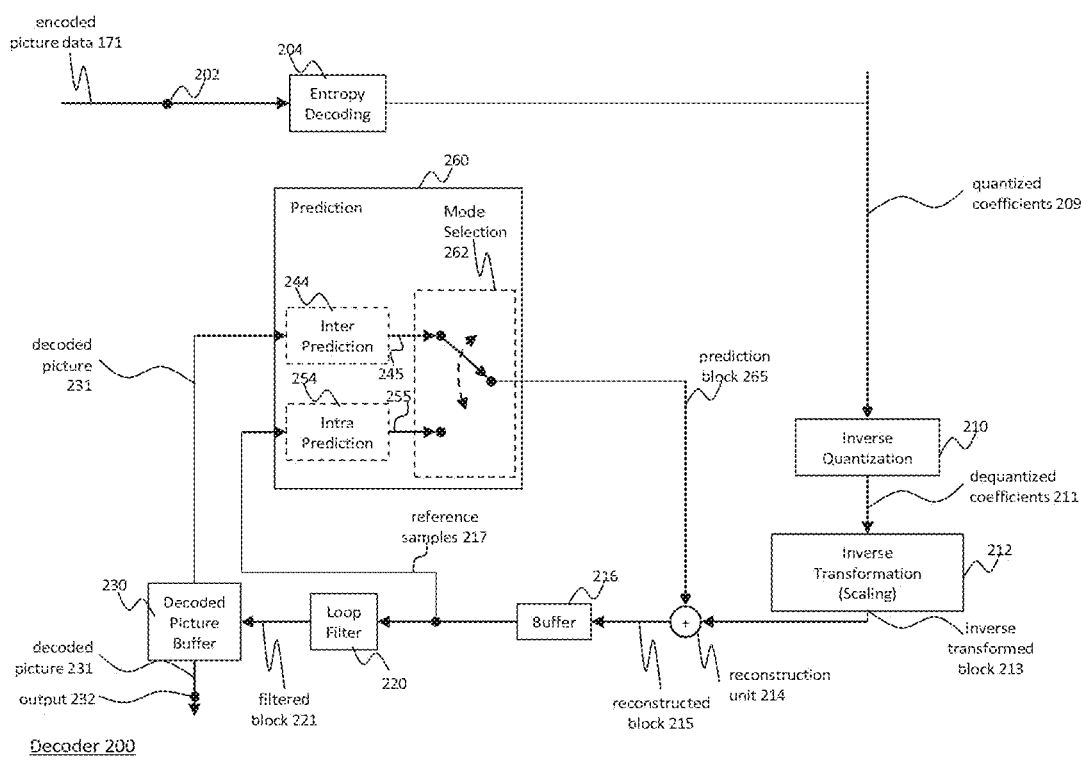
FIG. 2 is a block diagram showing an example structure of a video decoder configured to implement embodiments of the invention.

For example, the residual calculation unit 104, the transformation unit 106, the quantization unit 108, and the entropy encoding unit 170 form a forward signal path of the encoder 100, whereas, for example, the inverse quantization unit 110, the inverse transformation unit 112, the reconstruction unit 114, the buffer 118, the loop filter 120, the decoded picture buffer (DPB) 130, the inter prediction unit 144, and the intra-prediction unit 154 form a backward signal path of the encoder, wherein the backward signal path of the encoder corresponds to the signal path of the decoder (see decoder 200 in FIG. 2).

The encoder is configured to receive, e.g. by input 102, a picture 101 or a picture block 103 of the picture 101, e.g. picture of a sequence of pictures forming a video or video sequence. The picture block 103 may also be referred to as current picture block or picture block to be coded, and the picture 101 as current picture or picture to be coded (in particular in video coding to distinguish the current picture from other pictures, e.g. previously encoded and/or decoded pictures of the same video sequence, i.e. the video sequence which also comprises the current picture).

Partitioning

Embodiments of the encoder 100 may comprise a partitioning unit (not depicted in FIG. 1), e.g. which may also be referred to as picture partitioning unit, configured to partition the picture 103 into a plurality of blocks, e.g. blocks like block 103, typically into a plurality of non-overlapping blocks. The partitioning unit may be configured to use the same block size for all pictures of a video sequence and the corresponding grid defining the block size, or to change the block size between pictures or subsets or groups of pictures, and partition each picture into the corresponding blocks.

For example, in HEVC, the picture is subdivided into so-called coding tree units, CTUs. CTUs have the same size, which may be determined by some signaling parameters or fixed by standard. CTUs typically do not overlap. Each CTU may then be further split into coding and/or transform units, i.e. blocks for which prediction and/or transformation are performed, respectively. The splitting is performed recursively by providing possibility to divide each block further in four further blocks (quad-tree partitioning) or two further blocks (binary-tree partitioning) or any other kind of partitioning. The decision on whether a CTU is split and into which depth for each of the CTU's blocks may be taken by rate-distortion optimization. However, in general, the splitting may also be defined based on other criteria, such as presence of edges in the CTU, or the like. Accordingly, in the present disclosure, when referring to "block" or "unit" as a part of the image, CTU or any units obtained by CTU splitting—square or rectangular without being square—are meant. In general, embodiments are possible, in which the block may overlap.

Like the picture 101, the block 103 again is or can be regarded as a two-dimensional array or matrix of samples with intensity values (sample values), although of smaller dimension than the picture 101. In other words, the block 103 may comprise, e.g., one sample array (e.g. a luma array in case of a monochrome picture 101) or three sample arrays (e.g. a luma and two chroma arrays in case of a color picture 101) or any other number and/or kind of arrays depending on the color format applied. The number of samples in horizontal and vertical direction (or axis) of the block 103 define the size of block 103.

Encoder 100 as shown in FIG. 1 is configured encode the picture 101 block by block, e.g. the encoding and prediction is performed per block 103.

Residual Calculation

The residual calculation unit 104 is configured to calculate a residual block 105 based on the picture block 103 and a prediction block 165 (further details about the prediction block 165 are provided later), e.g. by subtracting sample values of the prediction block 165 from sample values of the picture block 103, sample by sample (pixel by pixel) to obtain the residual block 105 in the sample domain. Residual values (forming residual signal) correspond to prediction error (prediction error signal).

Transformation

The transformation unit 106 is configured to apply a transformation, e.g. a spatial frequency transform or a linear spatial (frequency) transform, e.g. a discrete cosine transform (DCT) or discrete sine transform (DST), on the sample values of the residual block 105 to obtain transformed coefficients 107 in a transform domain. The transformed coefficients 107 may also be referred to as transformed residual coefficients and represent the residual block 105 in the transform domain.

The transformation unit 106 may be configured to apply integer approximations of DCT/DST, such as the core transforms specified for HEVC/H.265. Compared to an orthonormal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operation, bit depth of the transformed coefficients, tradeoff between accuracy and implementation costs, etc. Specific scaling factors are, for example, specified for the inverse transform, e.g. by inverse transformation unit 212, at a decoder 200 (and the corresponding inverse transform, e.g. by inverse transformation unit 112 at an encoder 100) and corresponding scaling factors for the forward transform, e.g. by transformation unit 106, at an encoder 100 may be specified accordingly.

Quantization

The quantization unit 108 is configured to quantize the transformed coefficients 107 to obtain quantized coefficients 109, e.g. by applying scalar quantization or vector quantization. The quantized coefficients 109 may also be referred to as quantized residual coefficients 109. For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and corresponding or inverse dequantization, e.g. by inverse quantization 10, may include multiplication by the quantization step size. Embodiments according to HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the encoder 100 (or respectively of the quantization unit 108?) may be configured to output the quantization scheme and quantization step size, e.g. by means of the corresponding quantization parameter, so that a decoder 200 may receive and apply the corresponding inverse quantization. Embodiments of the encoder 100 (or quantization unit 108) may be configured to output the quantization scheme and quantization step size, e.g. directly or entropy encoded via the entropy encoding unit 170 or any other entropy coding unit.

The inverse quantization unit 110 is configured to apply the inverse quantization of the quantization unit 108 on the quantized coefficients to obtain dequantized coefficients in, e.g. by applying the inverse of the quantization scheme applied by the quantization unit 108 based on or using the same quantization step size as the quantization unit 108. The dequantized coefficients 111 may also be referred to as dequantized residual coefficients 111 and correspond—although typically not identical to the transformed coefficients due to the loss by quantization—to the transformed coefficients 108.

The inverse transformation unit 112 is configured to apply the inverse transformation of the transformation applied by the transformation unit 106, e.g. an inverse discrete cosine transform (DCT) or inverse discrete sine transform (DST), to obtain an inverse transformed block 113 in the sample domain. The inverse transformed block 113 may also be referred to as inverse transformed dequantized block 113 or inverse transformed residual block 113.

The reconstruction unit 114 is configured to combine the inverse transformed block 113 and the prediction block 165 to obtain a reconstructed block 115 in the sample domain, e.g. by sample wise adding the sample values of the decoded residual block 113 and the sample values of the prediction block 165.

The buffer unit 116 (or short "buffer" 116), e.g. a line buffer 116, is configured to buffer or store the reconstructed block and the respective sample values, for example for intra estimation and/or intra prediction. In further embodiments, the encoder may be configured to use unfiltered reconstructed blocks and/or the respective sample values stored in buffer unit 116 for any kind of estimation and/or prediction.

Embodiments of the encoder 100 may be configured such that, e.g. the buffer unit 116 is not only used for storing the reconstructed blocks 115 for intra estimation 152 and/or intra prediction 154 but also for the loop filter unit 120 (not shown in FIG. 1), and/or such that, e.g. the buffer unit 116 and the decoded picture buffer unit 130 form one buffer. Further embodiments may be configured to use filtered blocks 121 and/or blocks or samples from the decoded picture buffer 130 (both not shown in FIG. 1) as input or basis for intra estimation 152 and/or intra prediction 154.

The loop filter unit 120 (or short "loop filter" 120), is configured to filter the reconstructed block 115 to obtain a filtered block 121, e.g. by applying a de-blocking filter, sample-adaptive offset (SAO) filter or other filters, e.g. sharpening or smoothing filters or collaborative filters. The filtered block 121 may also be referred to as filtered reconstructed block 121.

Embodiments of the loop filter unit 120 may comprise (not shown in FIG. 1) a filter analysis unit and the actual filter unit, wherein the filter analysis unit is configured to determine loop filter parameters for the actual filter. The filter analysis unit may be configured to apply fixed predetermined filter parameters to the actual loop filter, adaptively select filter parameters from a set of predetermined filter parameters or adaptively calculate filter parameters for the actual loop filter as will be discussed in detail below.

Embodiments of the loop filter unit 120 may comprise (not shown in FIG. 1) one or a plurality of filters, e.g. one or more of different kinds or types of filters, e.g. connected in series or in parallel or in any combination thereof, wherein each of the filters may comprise individually or jointly with other filters of the plurality of filters a filter analysis unit to determine the respective loop filter parameters, e.g. as described in the previous paragraph.

Embodiments of the encoder 100 (respectively loop filter unit 120) may be configured to output the loop filter parameters, e.g. directly or entropy encoded via the entropy encoding unit 170 or any other entropy coding unit, so that, e.g., a decoder 200 may receive and apply the same loop filter parameters for decoding.

The decoded picture buffer (DPB) 130 is configured to receive and store the filtered block 121. The decoded picture buffer 130 may be further configured to store other previously filtered blocks, e.g. previously reconstructed and filtered blocks 121, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter estimation and/or inter prediction.

Further embodiments may also be configured to use the previously filtered blocks and corresponding filtered sample values of the decoded picture buffer 130 for any kind of estimation or prediction, e.g. intra and inter estimation and prediction.

The prediction unit 160, also referred to as block prediction unit 160, is configured to receive or obtain the picture block 103 (current picture block 103 of the current picture 101) and decoded or at least reconstructed picture data, e.g. reference samples of the same (current) picture from buffer 116 and/or decoded picture data 231 from one or a plurality of previously decoded pictures from decoded picture buffer 130, and to process such data for prediction, i.e. to provide a prediction block 165, which may be an inter-predicted block 145 or an intra-predicted block 155.

Mode selection unit 162 may be configured to select a prediction mode (e.g. an intra or inter prediction mode) and/or a corresponding prediction block 145 or 155 to be used as prediction block 165 for the calculation of the residual block 105 and for the reconstruction of the reconstructed block 115.

Embodiments of the mode selection unit 162 may be configured to select the prediction mode (e.g. from those supported by prediction unit 160), which provides the best match or in other words the minimum residual (minimum residual means better compression for transmission or storage), or a minimum signaling overhead (minimum signaling overhead means better compression for transmission or storage), or which considers or balances both. The mode selection unit 162 may be configured to determine the prediction mode based on rate distortion optimization (RDO), i.e. select the prediction mode which provides a minimum rate distortion optimization or which associated rate distortion at least a fulfills a prediction mode selection criterion.

In the following the prediction processing (e.g. prediction unit 160 and mode selection (e.g. by mode selection unit 162) performed by an example encoder 100 will be explained in more detail.

As described above, encoder 100 is configured to determine or select the best or an optimum prediction mode from a set of (pre-determined) prediction modes. The set of prediction modes may comprise, e.g., intra-prediction modes and/or inter-prediction modes.

The set of intra-prediction modes may comprise 32 different intra-prediction modes, e.g. non-directional modes like DC (or mean) mode and planar mode, or directional modes, e.g. as defined in H.264, or may comprise 65 different intra-prediction modes, e.g. non-directional modes like DC (or mean) mode and planar mode, or directional modes, e.g. as defined in H.265.

The set of (or possible) inter-prediction modes depend on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The prediction unit 160 may be further configured to partition the block 103 into smaller block partitions or sub-blocks, e.g. iteratively using quad-tree-partitioning (QT), binary partitioning (BT) or triple-tree-partitioning (TT) or any combination thereof, and to perform, e.g. the prediction for each of the block partitions or sub-blocks, wherein the mode selection comprises the selection of the tree-structure of the partitioned block 103 and the prediction modes applied to each of the block partitions or sub-blocks.

The inter estimation unit 142, also referred to as inter picture estimation unit 142, is configured to receive or obtain the picture block 103 (current picture block 103 of the current picture 101) and a decoded picture 231, or at least one or a plurality of previously reconstructed blocks, e.g. reconstructed blocks of one or a plurality of other/different previously decoded pictures 231, for inter estimation (or "inter picture estimation"). E.g. a video sequence may comprise the current picture and the previously decoded pictures 231, or in other words, the current picture and the previously decoded pictures 231 may be part of or form a sequence of pictures forming a video sequence.

The encoder 100 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter estimation parameters 143 to the inter prediction unit 144. This offset is also called motion vector (MV). The inter estimation is also referred to as motion estimation (ME) and the inter prediction also motion prediction (MP).

The inter prediction unit 144 is configured to obtain, e.g. receive, an inter prediction parameter 143 and to perform inter prediction based on or using the inter prediction parameter 143 to obtain an inter prediction block 145.

Although FIG. 1 shows two distinct units (or steps) for the inter-coding, namely inter estimation 142 and inter prediction 152, both functionalities may be performed as one (inter estimation requires/comprises calculating an/the inter prediction block, i.e. the or a "kind of" inter prediction 154), e.g. by testing all possible or a predetermined subset of possible inter-prediction modes iteratively while storing the currently best inter prediction mode and respective inter prediction block, and using the currently best inter prediction mode and respective inter prediction block as the (final) inter prediction parameter 143 and inter prediction block 145 without performing another time the inter prediction 144.

The intra estimation unit 152 is configured to obtain, e.g. receive, the picture block 103 (current picture block) and one or a plurality of previously reconstructed blocks, e.g. reconstructed neighbor blocks, of the same picture for intra estimation. The encoder 100 may, e.g., be configured to select an intra prediction mode from a plurality of intra prediction modes and provide it as intra estimation parameter 153 to the intra prediction unit 154.

Embodiments of the encoder 100 may be configured to select the intra-prediction mode based on an optimization criterion, e.g. minimum residual (e.g. the intra-prediction mode providing the prediction block 155 most similar to the current picture block 103) or minimum rate distortion.

The intra prediction unit 154 is configured to determine based on the intra prediction parameter 153, e.g. the selected intra prediction mode 153, the intra prediction block 155.

Although FIG. 1 shows two distinct units (or steps) for the intra-coding, namely intra estimation 152 and intra prediction 154, both functionalities may be performed as one (intra estimation comprises calculating the intra prediction block, i.e. the or a "kind of" intra prediction 154), e.g. by testing all possible or a predetermined subset of possible intra-prediction modes iteratively while storing the currently best intra prediction mode and respective intra prediction block, and using the currently best intra prediction mode and respective intra prediction block as the (final) intra prediction parameter 153 and intra prediction block 155 without performing another time the intra prediction 154.

The entropy encoding unit 170 is configured to apply an entropy encoding algorithm or scheme (e.g. a variable length coding (VLC) scheme, an context adaptive VLC scheme (CALVC), an arithmetic coding scheme, a context adaptive binary arithmetic coding (CABAC)) on the quantized residual coefficients 109, inter prediction parameters 143, intra prediction parameter 153, and/or loop filter parameters, individually or jointly (or not at all) to obtain encoded picture data 171 which can be output by the output 172, e.g. in the form of an encoded bitstream 171.

FIG. 2 shows an exemplary video decoder 200 configured to receive encoded picture data (e.g. encoded bitstream) 171, e.g. encoded by encoder 100, to obtain a decoded picture 231.

The decoder 200 comprises an input 202, an entropy decoding unit 204, an inverse quantization unit 210, an inverse transformation unit 212, a reconstruction unit 214, a buffer 216, a loop filter 220, a decoded picture buffer 230, a prediction unit 260, an inter prediction unit 244, an intra prediction unit 254, a mode selection unit 260 and an output 232.

The entropy decoding unit 204 is configured to perform entropy decoding to the encoded picture data 171 to obtain, e.g., quantized coefficients 209 and/or decoded coding parameters (not shown in FIG. 2), e.g. (decoded) any or all of inter prediction parameters 143, intra prediction parameter 153, and/or loop filter parameters.

In embodiments of the decoder 200, the inverse quantization unit 210, the inverse transformation unit 212, the reconstruction unit 214, the buffer 216, the loop filter 220, the decoded picture buffer 230, the prediction unit 260 and the mode selection unit 260 are configured to perform the inverse processing of the encoder 100 (and the respective functional units) to decode the encoded picture data 171.

In particular, the inverse quantization unit 210 may be identical in function to the inverse quantization unit 110, the inverse transformation unit 212 may be identical in function to the inverse transformation unit 112, the reconstruction unit 214 may be identical in function reconstruction unit 114, the buffer 216 may be identical in function to the buffer 116, the loop filter 220 may be identical in function to the loop filter 120 (with regard to the actual loop filter as the loop filter 220 typically does not comprise a filter analysis unit to determine the filter parameters based on the original image 101 or block 103 but receives (explicitly or implicitly) or obtains the filter parameters used for encoding, e.g. from entropy decoding unit 204), and the decoded picture buffer 230 may be identical in function to the decoded picture buffer 130.

The prediction unit 260 may comprise an inter prediction unit 244 and an inter prediction unit 254, wherein the inter prediction unit 144 may be identical in function to the inter prediction unit 144, and the inter prediction unit 154 may be identical in function to the intra prediction unit 154. The prediction unit 260 and the mode selection unit 262 are typically configured to perform the block prediction and/or obtain the predicted block 265 from the encoded data 171 only (without any further information about the original image 101) and to receive or obtain (explicitly or implicitly) the prediction parameters 143 or 153 and/or the information about the selected prediction mode, e.g. from the entropy decoding unit 204.

The decoder 200 is configured to output the decoded picture 230, e.g. via output 232, for presentation or viewing to a user.

Figure 4:
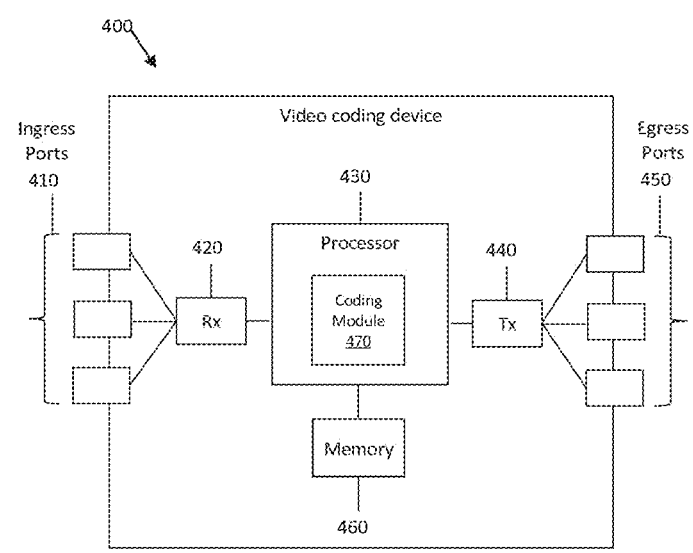
FIG. 4 is a block diagram of a video coder (encoder or decoder) with its interfaces.

FIG. 4 is a schematic diagram of a video coding device 400 according to an embodiment of the disclosure. The video coding device 400 is suitable for implementing the disclosed embodiments as described herein for example as an encoder or decoder. The video coding device 400 comprises ingress ports 410 and receiver units (Rx) 420 for receiving data; a processor, logic unit, or central processing unit (CPU) 430 to process the data; transmitter units (Tx) 440 and egress ports 450 for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals. The video coding device 400 may also include wireless transmitters and/or receivers in some examples.

The processor 430 is implemented by hardware and software. The processor 430 may be implemented as one or more CPU chips, cores (e.g., as a multi-core processor), field-programmable gate arrays (FPGAs), application specific integrated circuits (ASICs), and digital signal processors (DSPs). The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 comprises one or more disks, tape drives, and solid-state drives and may be used as an overflow data storage device, to store programs when such programs are selected for execution, and to store instructions and data that are read during program execution. The memory 460 may be volatile and/or non-volatile and may be read-only memory (ROM), random access memory (RAM), ternary content-addressable memory (TCAM), and/or static random-access memory (SRAM).

Note that this specification provides explanations for pictures (frames), but fields substitute as pictures in the case of an interlace picture signal.

Although embodiments have been primarily described based on video coding, it should be noted that embodiments of the encoder 100 and decoder 200 (and correspondingly the system 300) may also be configured for still picture processing or coding, i.e. the processing or coding of an individual picture independent of any preceding or consecutive picture as in video coding. In general only inter-estimation 142, inter-prediction 144, 242 are not available in case the picture processing coding is limited to a single picture 101. Most if not all other functionalities (also referred to as tools or technologies) of the video encoder 100 and video decoder 200 may equally be used for still pictures, e.g. partitioning, transformation (scaling) 106, quantization 108, inverse quantization 110, inverse transformation 112, intra-estimation 142, intra-prediction 154, 254 and/or loop filtering 120, 220, and entropy coding 170 and entropy decoding 204.

The person skilled in the art will understand that the "blocks" ("units") of the various figures (method and apparatus) represent or describe functionalities of embodiments (rather than necessarily individual "units" in hardware or software) and thus describe equally functions or features of apparatus embodiments as well as method embodiments (unit=step).

The terminology of "units" is merely used for illustrative purposes of the functionality of embodiments of the encoder/decoder and are not intended to limiting the disclosure.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit.

Embodiments may further comprise an apparatus, e.g. encoder and/or decoder, which comprises a processing circuitry configured to perform any of the methods and/or processes described herein.

Embodiments of the encoder 100 and/or decoder 200 may be implemented as hardware, firmware, software or any combination thereof. For example, the functionality of the encoder/encoding or decoder/decoding may be performed by a processing circuitry with or without firmware or software, e.g. a processor, a microcontroller, a digital signal processor (DSP), a field programmable gate array (FPGA), an application-specific integrated circuit (ASIC), or the like.

The functionality of the encoder 100 (and corresponding encoding method 100) and/or decoder 200 (and corresponding decoding method 200) may be implemented by program instructions stored on a computer readable medium. The program instructions, when executed, cause a processing circuitry, computer, processor or the like, to perform the steps of the encoding and/or decoding methods. The computer readable medium can be any medium, including non-transitory storage media, on which the program is stored such as a Blu ray disc, DVD, CD, USB (flash) drive, hard disc, server storage available via a network, etc.

An embodiment of the invention comprises or is a computer program comprising program code for performing any of the methods described herein, when executed on a computer.

An embodiment of the invention comprises or is a non-transitory computer readable medium comprising a program code that, when executed by a processor, causes a computer system to perform any of the methods described herein.

In surveillance problems, a key aspect is to detect whether interesting objects, such as persons, motor vehicles or non-motor vehicles and the like, even exist in the video image apart from the image background, whether these objects move and how fast. Dependent on these factors, the coding parameters may be adapted so as to achieve an optimal surveillance result.

For image processing, a human visual system model (HVS model) is used along with video processing algorithms, in particular for image and video coding algorithm, in order to efficiently compress and code the original input signal without significant loss of visual quality. In a video signal, the quality of each video frame may be tuned by adjusting the frame rate and resolution, based on the HVS model by which the perceptual quality may be improved within a bit rate limitation. The HVS-based optimization of video/image processing algorithm works well for those applications which are human eye-oriented, such as broadcast and video streaming applications. Within the HVS model, image compression standard like JPEG and video compression standard HEVC (High efficiency video coding) could be optimized and perceptually optimized quantization matrices could be applied to JPEG, while perceptual rate control could be applied to HEVC.

However, for non-HVS-based applications, such as machine-oriented video surveillance and visual analytics, the machine (i.e. the computer) needs to "see" and "check" the video automatically, such as to find/recognize the object (s) of interest. Since the video/image data acquired during e.g. video surveillance, it is not feasible for the human to check the entire content. Usually, a computer vision algorithm is used to detect, track objects and recognize objects.

However, computer vision algorithms as opposed to the human eye may have different criteria for assessing and judging the quality of image and video. In a number of computer vision problems it has been shown that high-frequency spatial information, such as gradients, is indeed a useful feature. However, such high-frequency information is less suitable for the human eye since it is less sensitive to those high spatial frequency changes, so that these spatial information may be removed in HVS-guided rate control scheme. Moreover, for assessing perceptual quality a high frame rate and high resolution are expected for human eye oriented applications.

In turn, for computer vision applications, a high frame rate and high resolution may for some scenarios not be necessary; for example, when objects move slowly in a video, a high frame rate may not be needed. When several persons in a video are very close to the camera, a lower frame resolution may be sufficient to perform the computer analytics of the video. Therefore, a high frame rate or a high spatial resolution might not be always necessary for computer vision applications. Thus, more bits are allocated only for those interesting regions in the video/image, in which an object is actually found.

In general, before an object may be identified within a video image or a frame of the video, for example, by feature extraction and feature classification via machine-learning-based methods, the object itself has to be actually detected within the image apart from the unimportant image background. This object detection on whether or not an object is present should occur in a fast and reliable manner.

Such an object detection can be performed using event cameras, which are cameras inspired by biology wherein vision sensors are used to mimic functions of the retina. As opposed to ordinary CMOS-based sensors, such vision sensors measure the change of the intensity per pixel, rather than the intensity itself. Moreover, such vision sensors are outside the ordinary paradigm of standard cameras using e.g. standard CMOS sensors, where video images are provided on a frame-to-frame basis. Rather, a vision sensor follows the biological paradigm, where the change of the intensity is measured independently and in an asynchronous manner.

Figure 5A:
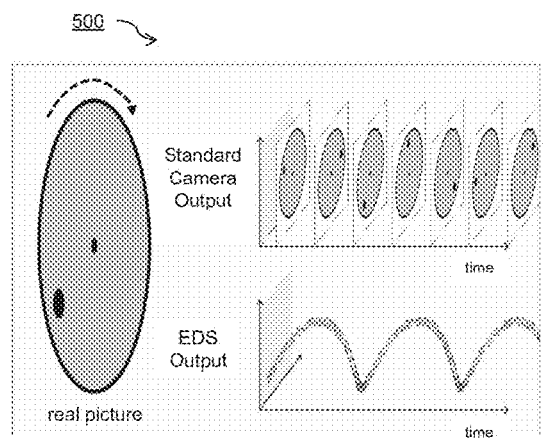
FIG. 5A is a schematic drawing for illustration of the difference between the output of a standard camera and an event-driven EDS camera.

FIG. 5A illustrates the difference between two image contents of a real picture, taken by a standard image sensor (e.g. CMOS) and an event camera based on event visions sensors. The real picture is a video image, which changes with time by rotating as indicated by the arrowed dashed line. The picture content is mostly homogeneous, which therefore remains unchanged with progressing time. Only the image content related to the black spot changes its location (here in a circular manner) within the picture.

The standard sensor takes frame images at regular time instances, i.e. the difference between the time point at which the sensor takes the CMOS frames is constant, as shown in FIG. 5A. Importantly, standard image sensors do not distinguish whether the content has changed or not from frame to frame—the frame content is based on intensity only. This means that still image portions of a picture are captured, even though this image portions do not provide any new image information between the different frames. Thus, for (quasi-)still pictures there is a large redundancy in storing and coding of those frame image portions, taken by standard image sensor.

In turn, the output of the event camera are event-driven signals (EDS), where a pixel vision sensor provides as output the positive or negative intensity changes rather than the intensity itself. In the example of FIG. 5A, this means that the image taken by the camera includes content only at those locations, where an intensity change occurs. When the real picture rotates uniformly, the EDS output of the event camera is therefore a (continuous) helical trajectory of the rotating black spot. Noticeably, the event camera provides an output also within those times, at which the standard camera does not. As evident from this example, the image content of the standard camera is full whereas the image content of the EDS camera is rather sparse.

Thus, the term "event" or the event-driven signal relate to changes occurring in the video image and is a means to indicate the amount of motion due to a moving object in the image. This (pixel/sample-wise) event information is obtained by an event-triggered camera.

Figure 5B:
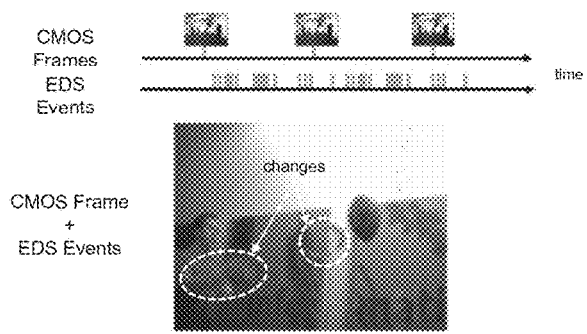
FIG. 5B is a schematic drawing for illustration of the synchronous versus asynchronous output signals of a standard camera and an event-driven EDS camera, and mapped data CMOS Frame+EDS events.

FIG. 5B shows another example of a more realistic scene, including a person which mainly moves its hands, throwing a football rotating. Thus, the content of the real picture does not only contain more texture and various objects, but in particular more irregular changes of the picture content. The standard camera captures the content again of the entire picture at regular time instances, containing only snapshots of the actions taking place in the real picture. This is shown in the upper part of the figure as "CMOS frames".

In contrast, the EDS camera outputs only locations of the intensity changes, as a result of the action-related changes of the moving objects in the real picture. The event-driven signals are output at irregular time instances at which the changes occurred, including those in between the time points at which the standard camera outputs the full frame images, as FIG. 5B shows (labeled as "EDS events"). This means that an EDS camera captures (intensity) changes of the picture content at a (much) smaller time resolution than of a standard camera.

The lower part of FIG. 5B shows how the content of the EDS camera is mapped in a standard camera frame in order to detect locally, within frame regions, which are associated with objects (here hands and football) undergoing motion, as opposed to regions without motion.

These motion regions are referred to as region of interest ROI, respectively, regions of non-interest RONI. As mentioned before, the ROI and RONI are regions within the video image, but they are determined (i.e. detected) based on event signals provided by an event-triggered camera. In other words, the locations of the events detected by the event-triggered camera are mapped onto the video images (frames) taken by the picture camera.

The term "event" refers to image intensity changes of a sample/pixel and/or a group of samples/pixels as a result of one object or multiple objects in the video image that may move at different speeds.

Thus, the amount of the speed and the amount of the image intensity change are directly related and an indicator of whether or not one or multiple objects are present in the image. Accordingly, a weak-motion region RONI is less interesting than a strong-motion region ROI. In other words, ROI and RONI of a video image indicate in which part of the image motion is larger (ROI) or weaker (RONI) compared to a predetermined threshold.

Thus, the term "region of interest" ROI relates to a region in the video image, in which the amount of motion of an object, as indicated by changes of the image intensity, is larger than when an object moves slowly or is a still object. Accordingly, such a weak-motion region is referred to as region of non-interest RONI.

Since the EDS signals, respectively, the EDS content is sparse, their content characteristics shows up within the full content of a frame only in certain frame areas, as marked in the lower part of FIG. 5B.

Therefore, standard cameras (CMOS) and EDS cameras provide to some extent complementary information that makes their combined use particularly interesting for video surveillance, for example. As a result, the characteristics of a video, in particular its dynamical characteristics, may be provided in a more straightforward manner, by which time in the further processing via analysis algorithms may be saved.

The technical effects derived from the combined usage of standard image sensors/camera and event-driven sensor/camera originate partly also from their complementary image capturing performance with regard to spatial and temporal resolution.

For example, a CMOS sensor has a spatial resolution of 1920×1080 for a full HD image and for a 4k image of 3840×2160. The temporal resolution is about 30 fps (frames per second), i.e. the time difference between adjacent frames is about 34 ms. An event-triggered sensor has a spatial (pixel) resolution of 128×128 and a temporal resolution of around one million (1M) samples per second (or even higher) corresponding to 1 MHz. However this is only an example, in practice, EDS sensors with various different temporal and spatial resolution may be provided. In general, the resolution of the EDS is smaller than or equal to the image sensor. Thus, in order to localize the motion in the images captured by the image sensor, the locations from the EDS sensor are mapped therein.

The disclosed embodiments utilize event-driven signals obtained e.g. by event-driven cameras to determine dynamic video characteristics and to use these for performing rate control of machine-oriented image/video encoding and coding.

The rate control is performed by adaptation of the spatial and temporal coding parameters, including block-wise quantization parameter QP values, and spatial resolution and temporal frame rate (ST parameter adaptation). These parameters are determined adaptively, so that an optimal spatial and temporal characteristics of videos may be obtained. These characteristics include, for example, the location and area of regions of interest ROI, the size of the interesting (i.e. detected) objects, and how strong the motion of the objects is.

Figure 6:
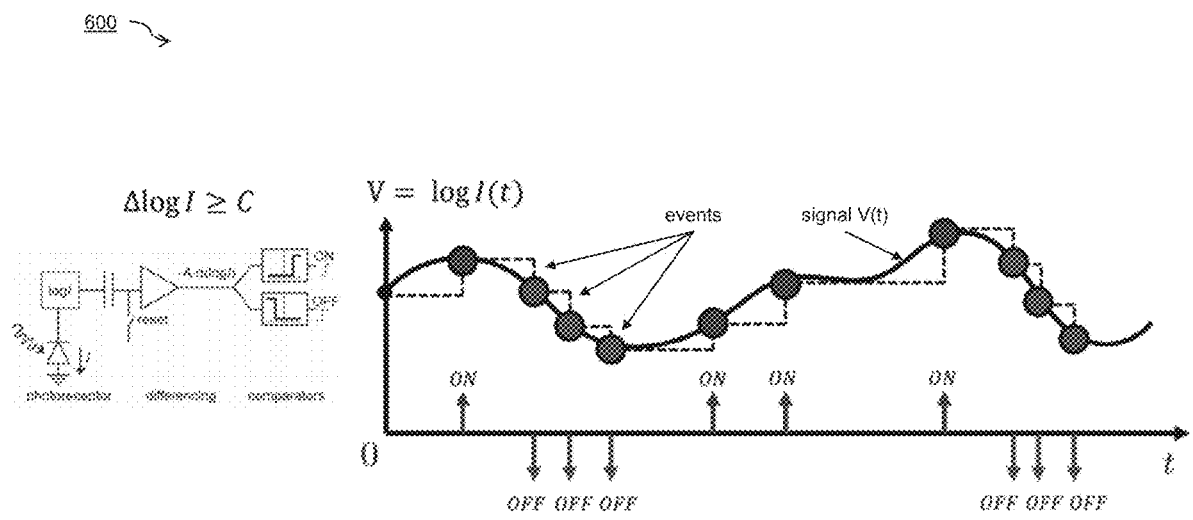
FIG. 6 is a schematic drawing for illustration how to obtain an event from a single event-triggered sensor.

FIG. 6 illustrates how an event-driven sensor (also referred to as event-triggered sensor, event sensor, event vision sensor) generates an event signal by example of a single event-driven pixel. Shown is a time-dependent first output signal V(t) versus time t. The quantity V(t) may for example be a photo voltage or photo current provided by a photodiode or phototransistor or the like. Such a signal voltage or current may be a measure of the amount of the intensity (e.g. luma or chroma).

The event-driven pixel sensor outputs a non-zero signal, defining the event, when the amount of the change in V(t) is larger than a predetermined threshold C, since the last event. The change may be a change in intensity, with the change being positive or negative. Since the time-dependency of the signal V(t) is irregular, the times at which an intensity change exceeds the threshold are irregular. In other words, an event-driven signal is asynchronous as it is triggered by the amount of the intensity change of the original irregular signal V(t). This is illustrated by the up- and down arrows in FIG. 6, where the time difference between the positive/negative events varies depending on how strongly the signal V(t) changed from certain time points onward.

This is to be distinguished from standard image sensors, where the sensor outputs an image signal (being the intensity rather than the intensity change) at regular time instances. Thus, standard image sensors provide an image intensity of the real picture at regular time points.

The left part of FIG. 6 shows a possible circuit implementation of an event-driven pixel sensor, including a photoreception (i.e. photo diode, phototransistor), a differentiating Operational Amplifier (OP or OP-Amp), used for instance as differential amplifier, and a circuit for thresholding. This is well known to a person skilled in the art.

The output signal, being the event signal or the event, includes the positive/negative amount of the intensity change and the location of the intensity change. The term location refers to the location at which the event occurs, i.e. the coordinate of the respective pixel where the intensity change exceeded the threshold. The term location may alternatively or in addition refer to the time (i.e. the time stamp) at which the intensity change occurred at said pixel coordinate.

Event cameras have been used for object detection by detecting motion, based on a time-difference information of a pixel. In the approach of Patent Application U.S. Pat. No. 9,817,507 B2, an event is detected from the multiple pixels and the event signal is output. The time information, corresponding to the pixel in which event occurs, is stored. The event signal, including its time information corresponding to a predetermined time range, is then extracted.

Figure 7:
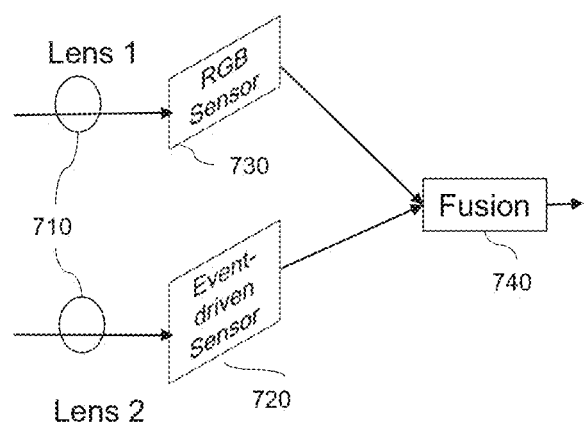
FIG. 7 is a schematic drawing of a dual-camera setup, with RGB sensor and event-driven sensor separated.
Figure 8:
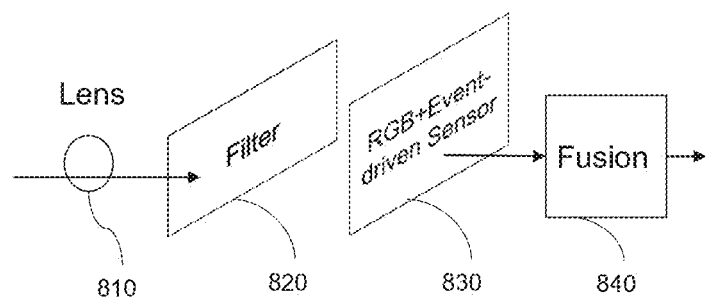
FIG. 8 is a schematic drawing of a single-camera setup, with RGB sensor and event-driven sensor joined.

FIGS. 7 and 8 exemplify two different arrangements of a video image capturing device. In particular, FIG. 7 shows a video capturing device with two separate optical systems. The first optical system is formed by a lens 710 (or a plurality of lenses) 1 and a RGB sensor 730, while the second optical system is formed by a lens 710 (or a plurality of lenses) and an event-driven sensor 720. If the relative position of the RBG and EDS sensors is known, a mapping of the motion captured by the EDS sensor onto the video images of the RGB sensor can be performed in the fusion block accordingly.

On the other hand, FIG. 8 shows a video capturing device with a common lens 810 (or lens system) 2. After filtering of the picture captured by a filter 820, the RGB and EDS sensors are co-located. The signals of the RGB and EDS sensors are then fused in the fusion block 840, in which the EDS sensor signals are mapped onto the video image captured by the RGB sensor.

An exemplary result of such an EDS-RGB image fusion is shown in the lower part of FIG. 5B, where the EDS events are overlaid (i.e. mapped by fusion) onto a CMOS frame (i.e. a RGB image frame). The image frame has the full image content taken by the standard camera at a particular time, with the EDS event signals indicating regions in the image where motion of the objects (here hands and football) took place.

Figure 9A:
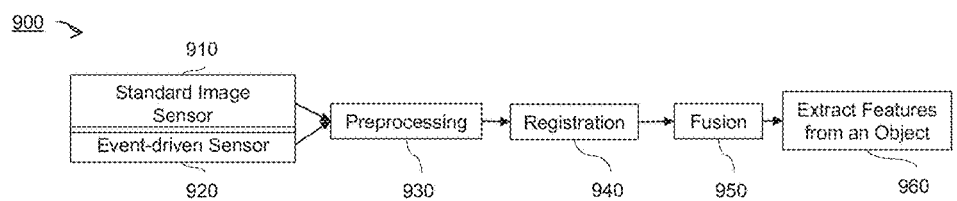
FIGS. 9A, 9B, 9C are schematic drawings for illustration of different orders of processing.
Figure 9B:
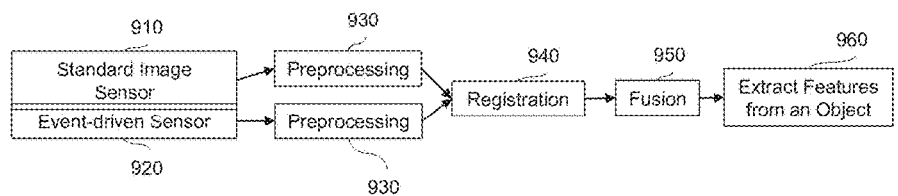
Figure 9C:
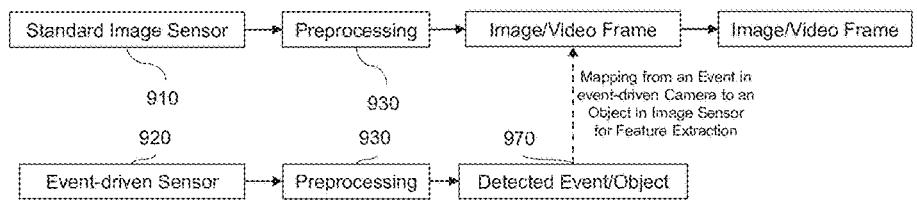

As shown in FIGS. 9A and 9B, before content fusion the content captured by the standard image sensor 910 and of the event-driven sensor may 920 be subject to preprocessing 930 combined (cf. FIG. 9A) or separate (cf. FIG. 9B) before registration 940 and fusion 950. The fused, i.e. combined content may then be used to extract 960 further features of the object. Alternatively, an object may be detected 970, based on the pre-processed 930 EDS signal provided by the event-driven sensor 920, as shown in FIG. 9C. This event-based detection result is mapped onto an object in the (real) image of the standard image sensor 910, in order to extract a feature of the object.

The feature extraction, once an object is detected, may be performed through well-established machine-learning approaches, including a neural network NN, deep neural network DNN, convolutional neural network CNN, fully connected neural network FCNN, support vector machine SVM, or any other learning model.

Figure 10:
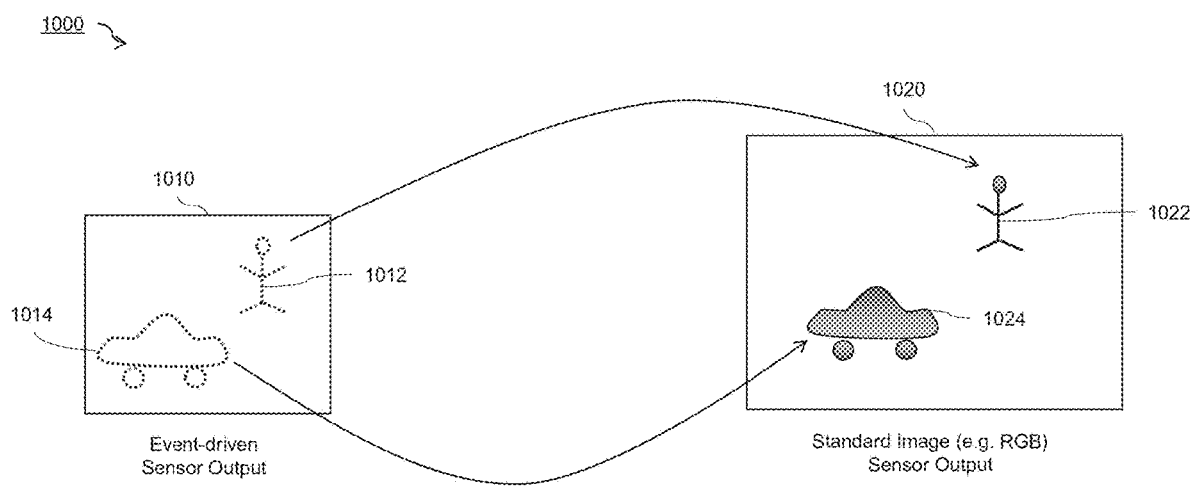
FIG. 10 is a schematic drawing for illustration of the mapping of event-driven sensor output onto the standard image sensor output for object detection.

FIG. 10 illustrates what is meant by "mapping from event in an event camera to an object in image sensor". The two sensors, standard image sensor and event-driven sensor, provide each a content image 1020 and 1010, respectively. Since the EDS camera outputs intensity changes and the standard camera outputs intensity, the EDS content includes only the shapes (i.e. contour edges) of moving objects 1012 and 1014.

As mentioned before with reference to FIG. 6, the EDS content, respectively, the EDS signal output by an event-driven pixel, includes the amount of the intensity change and the location of the intensity change, with the location being the position of the intensity change (with reference to pixel coordinates) and the time at which the intensity change occurs. Thus, the sparse EDS content may be mapped onto the content of the standard image, and used to detect the full objects 1022 and 1024. The mapping of the EDS location onto a frame of the standard image sensor, so as to match a corresponding location, i.e. the position of an image sample may be performed by a pixel registration algorithm, for example. This is well-established in image registration, where data sets obtained by different sensors need to be matched, i.e. mapped onto the same image.

In other words, the contour shapes tracked by the EDS camera at those times between adjacent standard image frames are overlaid on a full image frame, so that the objects are detected with the standard image through their shapes. After object detection, a subsequent extraction of a feature of the detected object may be performed via machine-learning approach.

As disclosed in the following exemplary embodiments of the invention, the present disclosure exploits event signals for adaptation of one or multiple coding parameters used for encoding the video image.

According to an embodiment, an apparatus is provided wherein a video image, including a plurality of video frames, is encoded using coding parameters, so as to provide a video bitstream as the output. The encoding may be one of the known compression standards, such as AVC, HEVC, JPEG2000, or the like. In the following, the terms "video", "video image", "video frame", or "frame" are used interchangeably.

The apparatus comprises a circuitry configured to obtain the video image from an image sensor. The image sensor may by a standard image sensor, such as a CMOS sensor.

An event signal is further obtained by an event-triggered sensor, with the event signal indication a location of an image intensity change. The location of the intensity change may be a location, corresponding to a pixel coordinate of the event-triggered sensor, where the intensity change takes place. The location may in addition or alternatively be a time at which point in time the intensity change occurs in said pixel.

A coding parameter for encoding the video image is determined (i.e. adapted) in accordance to the obtained event signal.

The video image is encoded by applying the adapted coding parameters.

The coding parameters may be determined for one sample or a group of samples of the video image. The coding parameters of different single samples or different groups of samples may be different.

The event signal may in addition or alternatively indicate the amount of the intensity change. The intensity change may be positive or negative.

A coding parameter may be any of frame rate, picture size, or quantization parameter QP. The coding parameters picture size and quantitation parameter CP refer to parameters of the spatial resolution. The frame rate refers to temporal resolution. The adaptation of picture size and frame rate is also denoted as ST adaptation. The coding parameters to be adapted for encoding the video image are not limited to frame rate, picture size or quantization parameter. Other parameters used for encoding may include block splitting (how the video frame is segmented into blocks of possibly different size and/or shape), type of prediction or prediction mode, or the like.

Figure 11:
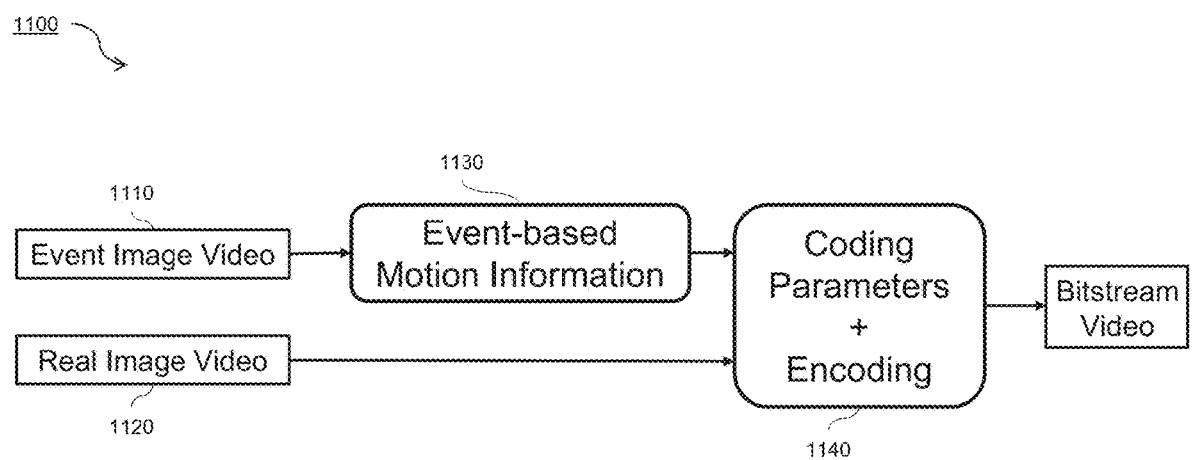
FIG. 11 is a block diagram of an embodiment in which coding parameters are adapted according to event-based motion information.

FIG. 11 shows an exemplary embodiment of the invention, where a video image is encoded in module 1140 to generate a bitstream video based on coding parameters. In the embodiment of FIG. 11, the adaptation of the coding parameters is performed also by the encoding module 1140. The coding parameters are adapted based on event-based motion information determined by module 1130.

The real video image 1110, corresponding to the video image, may be obtained by a standard image sensor such as a CMOS sensor, capturing the image content of a real picture. The image content of the video image or its frames includes intensity (luma and/or chroma). The event-based motion information determination 1130 is obtained from an event image video 1120. The event image video corresponds to an output of an event-driven/event-triggered sensor, including a plurality of event-driven/event-triggered pixels. The content of the event video image includes an event signal from an event pixel of the plurality of event pixels of the event video image.

The video image includes a sample or a group of samples. The sample is encoded by applying the determined coding parameters. The encoding of a sample is performed by an encoder 1140 and provides the encoded video image as a bitstream video. The encoding of the sample may include encoding of one sample or a group of samples. The encoder may encode one sample or a group of samples differently in accordance with the different coding parameters.

In the exemplary embodiment of FIG. 11, the processing circuitry of the apparatus is configured to perform both the adaptation of the coding parameters and the encoding. However, the coding parameter adaptation and the image encoding may be instead performed by different circuitries, arranged on the same or different chips. In other words, any of the tasks as discussed henceforth may be performed in a combined manner by a single circuitry or different circuitries. Parts of the tasks may also be combined in any suitable manner depending on the application.

In standard video encoders, the coding parameters, such as frame rate, spatial resolution, or compression strength are input to the encoder by a user, for example, by the application which uses the encoder and/or by a person employing the encoder. Some encoder implementations may, on the other hand, determine other coding parameters or even adapt the input coding parameters, based on rate-distortion optimization or rate-distortion-complexity optimization, or the like.

In the present disclosure, the coding parameters input to the encoder are (pre)determined automatically, based on the event characteristics. This functionality is not necessarily a part of the encoder circuitry and may be implemented in a separate integrated circuit or other piece of software and/or hardware. However, the present disclosure is not limited to such implementation and the coding parameter determination may be implemented within the same hardware piece (IC, processor or the like) as the encoder.

Figure 12:
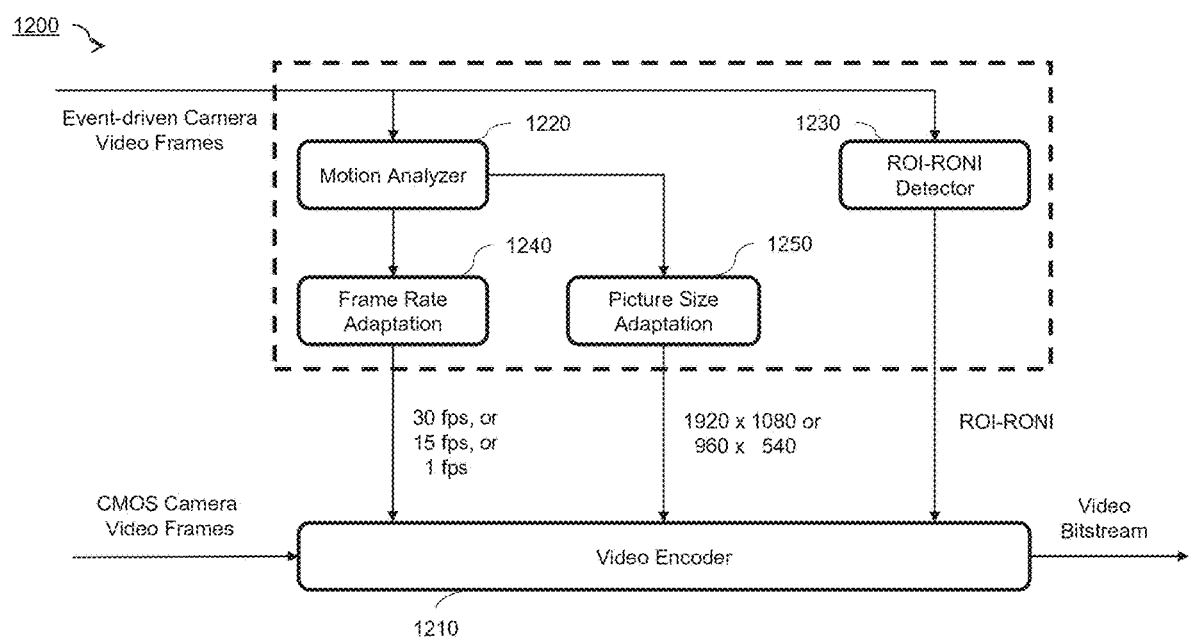
FIG. 12 is a block diagram of an embodiment, including various modules for coding parameter adaptation, using event-based motion analysis and event-based ROI-RONI detection.

According to an embodiment shown in FIG. 12, the processing circuitry of the apparatus (marked by the dashed box) is configured to perform the tasks of the analysis of motion by a motion analyzer 1220 based on the event-based motion information and the adaption of the coding parameters, including frame rate adaptation 1240, picture size adaptation 1250, and QP adaptation via ROI-RONI detector 1230.

Herein, the encoder 1210, respectively, the circuitry is separate from the coding parameter adaptation, i.e. modules 1240, 1250, and 1230. Separating the circuitry of the encoder, i.e. the encoder 1210 itself, from the other circuitries allows using a standard video encoder (e.g. H.264/AVC or HEVC (H.265)). In this case, the encoder needs an interfacing with the external functional blocks of the other modules. These modules 1240, 1250, and 1230 then perform the coding parameter adaptation based on the event-based motion information. The adapted coding parameters are provided to the encoder 1210 by signaling for example. From the above description it is clear that each of the functional blocks of the apparatus may have its own circuitry in general, implemented as hardware and/or software.

According to an embodiment, the processing circuitry is configured to determine motion information based on the event signal, indicating motion of an object in the video image. The motion information is calculated using a metric of the image intensity change.

The metric of the image intensity change may be the p-norm, with p being a positive integer equal to or larger than one. Other types of metric fulfilling the well-known metric conditions may be used as well.

The motion information indicating motion of an object is, for example, the sum of the absolute value of the intensity change of each event-pixel sensor (i.e. of the event signal of an event pixel) for a frame, provided by an event-triggered camera.

The term motion refers to a temporal change of the location of an object or multiple objects within the video image (corresponding to changes in pixel coordinates), resulting in intensity changes (luma and/or chroma) of a sample or a group of samples of a frame. Thus, the amount of the motion information or motion is an indicator whether or not an object or multiple objects exist in the frame.

Other kinds of motion information may be calculated from the event signals in addition or alternatively. For example, motion may be indicated based on motion statistics, including mean and/or standard deviation and/or skewness of the event signals. Depending on any of such value, any of the coding parameters related to temporal or spatial resolution may be adapted accordingly.

In general, motion information may be calculated for a group of event signals and/or multiple groups of event signals of an event image frame taken by the event-triggered camera. The group of event signals, corresponding to a group of event-triggered pixels, may be non-overlapping or overlapping.

Based on the motion information, an object is detected at a location within the video image in correspondence with the locations of the image intensity change. The object is detected when the calculated motion information is equal to or larger than a predetermined threshold.

The threshold used for the object detection may be the same threshold value used in the ST-parameter adaptation. Alternatively, the threshold for the object detection may be different from the one in the ST-parameter adaptation. This allows for a separate tuning of the criteria in the adaptation process of the ST-parameters and in the object detection process. This makes the approach of the application more flexible.

According to an embodiment, the processing circuitry is configured to determine the coding parameter related to time resolution or spatial resolution of the video image according to the calculated motion information and/or the detected object.

Dependent on the magnitude of the calculated motion, coding parameters related to temporal or spatial resolution are adapted.

According to a first embodiment, the processing circuitry is configured to adapt the coding parameters depending on whether or not an object is detected. According to this criterion, the frame rate and/or picture size are increased each with reference to a default value, when the object is detected. When no object is detected, the frame rate and/or picture size are retained or decreased each with reference to the default value.

According to a second embodiment, the coding parameters may be adapted according to an additional criterion. Therein, the processing circuitry is configured to retain the frame rate and picture size each with reference to a default value, when the object is detected and is moving with a speed at or below a predetermined speed threshold. When the object is detected and is moving with a speed larger than the speed threshold, the frame rate is increased with reference to the default value. When no object is detected, the frame rate and picture size are decreased each with reference to the default value.

In view of the second embodiment, Table 1 shows exemplarily how the ST parameters, frame rate and picture size, may be adapted further depending on the magnitude of the motion m, calculated by the motion analyzer 1220. The calculated motion corresponds to the speed at which an object moves within the video image.

TABLE 1

Rules for spatial-temporal adaptation for
video coding using motion analyzer results.

|  | Conditions | ST-Parameters | |
| --- | --- | --- | --- |
| Option | Motion analyzer | Frame rate | Picture size |
| Standard | m >= TH | 30 fps | 1920 × 1080 |
| Low motion | TL <= m < TH | 15 fps | 1920 × 1080 |
| Standby | m < TL | 1 fps | 960 × 540 |

The speed, corresponding to the motion information respectively the motion, may be calculated, for example, by the sum of the absolute value of the intensity change of each event-pixel sensor (i.e. of the event signal of an event pixel) for a frame, provided by the event-triggered camera. Since motion is presumed to be prevalent only when an object is present in the video image so as to cause image intensity changes when it moves, the summed magnitudes of the temporal changes of the image intensity is a measure for the overall speed of the object.

Other kinds of motion information that may be used to specify the speed of an object may be calculated from the event signals alternatively or in addition to the example provided above. For example, the speed (i.e. motion) may be also indicated based on motion statistics, including mean and/or standard deviation and/or skewness of the event signals. Depending on any of such value alone or combined, any of the coding parameters related to temporal or spatial resolution may be adapted accordingly.

In the example of Table 1, two threshold values TH and TL are introduced by which three regions "Standby", "Low motion", and "Standard" are defined, along with their respective value for frame rate and picture size.

These threshold values $T_H$ and $T_L$ correspond to the predefined speed threshold. In other words, the decision whether an object moves slowly or quickly in the video image is decided by thresholding. In the exemplary case of Table 1, this threshold is specified in terms of an interval $[T_H, T_L]$ for the motion (speed). Alternatively, a single value for the predetermined speed threshold may be used.

As default value for either coding parameter frame rate and picture size, the respective value of the option "Low motion" is assumed. However, each of the coding parameters may have its default value according to different "Options".

The values for TH and TL may be predefined and set within the encoder/decoder and/or may be set by the user remotely, for example. Further, the values for the frame rate and picture size are not restricted to the above values, but rather may be altered accordingly with advancing technology. For example, the standard setting of the picture size of 1920×1080 may be altered for 4k videos to 3840×1280. Also, the frame rate may increase further with as increasing speed of the processing chips.

According to a third embodiment, the coding parameters may be adapted based on speed only. This means that any of the coding parameters is adapted only there is speed detected that exceeds a speed threshold. For instance, coding parameters are adapted if there was any motion detected. Motion requires in turn that an object exists in the video image, especially in a scenario when an event-triggered sensor is used. Hence, a possible separate or additional object detection may not be necessary, as it is implicit to the event-triggered sensor output.

In full HD, the default resolution is 1920×1080 (corresponding to picture size). An alternative of a lower resolution is 960×540. Thus, the picture size is a coding parameter related to spatial resolution. The specified pixel numbers specifying picture sizes are not limited thereto. These may alter with advancing video image and display technology toward even higher spatial resolution, resulting in a larger picture size. For example, the default resolution in 4k technology will be 3840×2160, with 1920×1080 or 960×540 being the lower alternative resolutions.

As shown in FIG. 12, the calculation motion information (here the motion m), is signaled to the frame rate adaptation 1240 and picture size adaptation 1250, respectively. In each of these modules 1240 and 1250, the frame rate and/or picture size may be adapted depending on the value of motion m, for example, according to Table 1.

The respective adapted coding parameters are subsequently signaled to the video encoder 1210, which uses these value for encoding the video image.

Next, the adaptation of the quantization parameter QP is detailed further.

According to an embodiment, the processing circuitry is configured to determine a region of interest ROI and a region of non-interest RONI within the video image, based on the event signal. According to the ROI and RONI, respective coding parameters are determined for each region for coding the samples within the ROI and RONI. The samples are encoded within the ROI and RONI by applying the respective coding parameter.

The determination of the ROI and RONI based on the event signal means that the event signal is used to determine an amount of the event signal (e.g. its absolute value) and assign a sample or a group of samples to a ROI, when the determined amount is larger than a predetermine value and otherwise to a RONI. As mentioned before, ROI and RONI refer to those regions in the video image, where motion of an object or multiple objects is prevalent (ROI) or not RONI, with the object motion causing image intensity changes. How strongly the motion is pronounced depends on the strength of the motion, i.e. its absolute value and reflected by the magnitude of the event signal. Thus, by comparing the event signal magnitude to a predefined threshold, a region in which a sample or a group of samples is located in the image may be segmented in pixel-wise or block-wise regions of pronounced motion ROI or weak motion RONI.

According to an embodiment shown in FIG. 12, the regions ROI and RONI are determined by a ROI-RONI detector 1230, using the event signals from the event-triggered camera as input. The ROI-RONI determination may be performed by detector 1230.

According to an embodiment, ROI and RONI, corresponding to a ROI-RONI bitmap, are detected by comparing for each event signal an absolute value of the image intensity change with a second predefined threshold. The bits related to the bitmap are bits per unit and unit corresponding to one or more samples.

When the absolute value is equal to or larger than the second predetermined threshold, the respective value is set to one and otherwise to zero.

The value one (i.e. bit-value "1") is associated within ROI and the value zero (i.e. bit-value "0") is associated outside the ROI, corresponding to RONI.

In correspondence to the location of the image intensity change based on the set value one, the sample of the video image is marked as part of the object, and encode the ROI and RONI.

The marking of a sample or a group of samples of the video image in correspondence to the intensity change is enabled by calibrating the event-driven camera with the standard (RGB) image sensor camera beforehand. This allows to assign an intensity change to a corresponding location within the video image.

The output of the ROI-RONI detector including the bitmap indicates on a one-bit level, whether the sample or the block of samples is a ROI or RONI by setting the 1-bit for ROI and o-bit to RONI. In other words, the ROI-RONI bitmap may be a pixel-wise or block-wise bitmap.

The block-wise bitmap may be obtained by the ROI-RONI detector by setting the bit value of an entire coding tree unit CTU and/or a coding unit CU of a frame image to one, corresponding to all samples in the CTU/CU, if the CTU/CU contains one or more ROI samples.

The ROI-RONI detector 1230 signals the ROI-RONI bitmap to the video encoder 1210, which performs the ROI and RONI coding.

According to an embodiment, the object is detected within the video image, based on the calculated motion information and the detected ROI, by mapping the ROI-RONI bitmap onto the video image, so as to match locations of the samples of the video image.

Since the event-driven camera and the standard image camera are calibrated beforehand, the mapping of the bitmap may be performed by the ROI-RONI detector, which then does not need the video image as additional input.

According to an embodiment, the location of the intensity change is mapped onto a location of the sample, corresponding to a coordinate of the sample in the video image.

Since the event-driven camera and the standard image camera are calibrated, the encoder 1210 may convert the input ROI-RONI bitmap into a corresponding bitmap of the video image.

As explained before with reference to FIGS. 10 and 5, the term mapping of the bitmap, obtained based on the event-triggered events, respectively of the location means that the bitmap has bit-values "1" at locations in the event-triggered frame, which have corresponding locations (i.e. sample/pixel coordinates) within the video image. This is because the event signal also indicates the location (i.e. the position) of the image intensity change. This allows therefore to map the bitmap and/or the intensity change location onto the video image, i.e. the standard video image, so as to match a corresponding location in the video image. This mapping of the locations of the event-triggered data, obtained by the event-triggered sensor onto locations of another data obtained by the standard image sensor may be performed by a pixel registration algorithm.

Since the ROI-RONI regions and the motion information are determined based on event signals in conjunction with thresholding and the event being associated with motion of an object within the video image, the object can be actually detected within the video image after the mapping. This is illustrated in FIG. 10 and, for a real frame, in the lower portion of FIG. 5B.

The coding parameter QP related to spatial resolution can now be determined. The adaptation of the QP parameter(s) may be performed by the encoder 1210 depending on the encoder type, for example, in the rate control module (not shown). Alternatively, the QP parameter(s) may be adapted by an external circuitry not part of the encoder.

According to an embodiment, the coding parameter QP for a coding block of the video image is determined by decreasing the QP, when a part or the entire coding block is within the ROI and/or the object is detected. The QP is increased, when the coding block is within RONI.

The coding block may be a coding tree unit CTU and/or a coding unit CU of the video image or a frame of the video image.

The quantization parameter refers to the inverse number of bits used for encoding. Thus, a small QP value corresponds to a large number of bits, respectively, a large number of smaller increments. As a result, finer spatial variations within the video image may be encoded, improving image quality.

In the exemplary embodiment of FIG. 12, the video encoder 1210 performs adaptation of the QP values according to the ROI-RONI bitmap signaled from the ROI-RONI detector 1230.

In case of standard HEVC codecs, the ROI-RONI indication is through a block-wise bitmap, i.e. on a CTU/CU basis for compatibility reasons. The encoder 1210 uses the bitmap and adapts the coding parameter QP for each CTU/CU according to whether the respective entry in the bitmap is "1" or "o".

When the CTU (or the coding block) is ROI, as indicated by the bit value "1" in the bitmap, the encoder 1210 reduces the QP value, corresponding to a higher bit resolution. In other words, spatial gradations in the image content (in terms of luma and/or chroma) can be resolved by a larger number of (differing) values. In turn, when the CTU/CU is RONI, as indicated by the bit value "o", the encoder 1210 increases the QP value.

For HEVC, the difference between the smaller QP and the higher QP may be 12. However, this may be changed depending on the desired image quality of the ROI.

After object detection, a subsequent extraction of a feature of the detected object may be performed via machine-learning approach.

According to an embodiment, the apparatus comprises a processing circuitry configured to extract a feature of the detected object. A coding parameter is determined according to the extracted feature, and the feature is encoded by applying the coding parameter.

The feature may be any feature needed for a certain application. For example, conventional features may include scale-invariant-feature-transform SIFT, speed-up-robust-features SURF, or binary-robust-independent-elementary-features BRIEF or the like.

In case of SURF, such features may be those obtained from corresponding descriptors, such as Gaussian derivatives, moment invariants, complex features, steerable filters, phase-based local features, or descriptors representing the distribution of smaller-scale features within the interest point of neighborhood. These features distinguish by being robust and may be calculated fast.

SIFT, in turn, aims extracting scale-invariant features from video images, so as to achieve a reliable matching between different views of the scene and/or object(s). These features may include potential interest points along with the determination of their local stability and orientation, based on local image gradient directions. SIFT generates in general a large number of features. For example, an image comprised of 500×500 pixels provides about 2000 stable features. A sufficient amount of such stable features is important for object recognition, in particular when objects are small so as to achieve a robust matching. This is described in more detail by D. G. Lowe, "Distinct Image Features from Scale-Invariant Keypoints", accepted for publication in the International Journal of Computer Vision 2004.

The features may also be more advanced, such as CNN-based features, as detailed for example by Choi and Bajic, "Deep Feature Compression for Collaborative Object Detection", arXiv: 1802.03931v112 February 2018.

The coding parameter used for encoding the extracted feature may be different from any of the ST coding parameters or QP parameter. Alternatively, the feature coding parameter may be the same as any of the ST parameters or QP parameter or the like.

The extraction of the feature of the detected object may be performed by a neural network NN, for example. Alternatively, the feature extraction may be performed by any other machine-learning approach, including a deep neural network DNN, convolutional neural network CNN, fully connected neural network FCNN, support vector machine SVM, or the like.

According to an embodiment, method is provided for encoding samples of a video image comprising the steps of obtaining the video image from an image sensor; obtaining, from an event-triggered sensor, an event signal indicating location of image intensity change; determining a coding parameter for encoding the video image according to the obtained event signal; and encoding the video image by applying the determined coding parameter.

Figure 13:
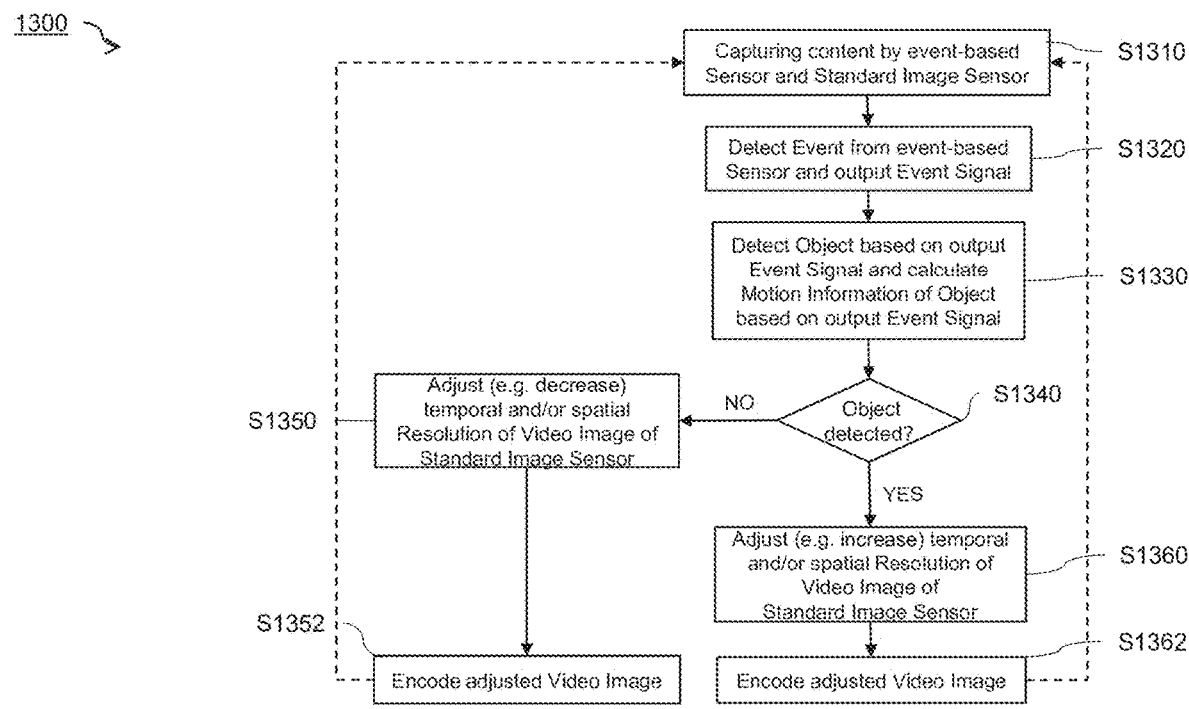
FIG. 13 is a flowchart of a related method of an embodiment for event-based object detection and event-based coding parameter adaptation.

According to an exemplary embodiment of FIG. 13, content of a real picture is captured by an event-based sensor and standard image sensor S1310. An event from the event-based sensor is detected and the respective event signal is output S1320. Based on the event signal, an object is detected and motion information of the object is calculated S1330.

If an object is detected S1340 (YES), the temporal and/or spatial resolution (i.e. the respective coding parameters) of the video image captured by the standard image sensor area increased S1360. The adjusted video image is encoded 1362.

If an object is not detected S1340 (NO), the temporal and/or spatial resolution (i.e. the respective coding parameters) of the video image captured by the standard image sensor area decreased S1350. The adjusted video image is encoded 1352.

Figure 14:
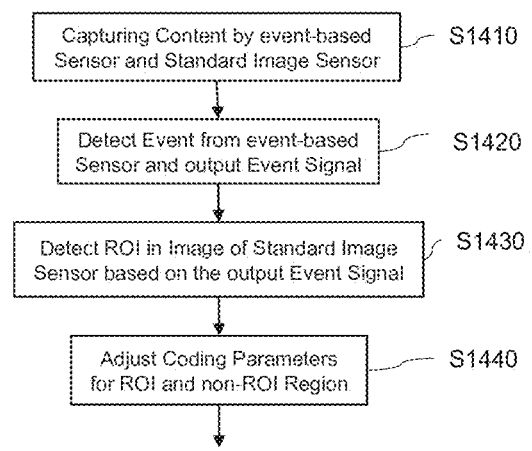
FIG. 14 is a flowchart of a related method of an embodiment for event-based ROI-RONI detection and adaptation of respective ROI-RONI coding parameters.

According to an exemplary embodiment of FIG. 14, content of a real picture is captured by an event-based sensor and standard image sensor S1410. An event from the event-based sensor is detected and the respective event signal is output S1420. Based on the event signal, a region of interest ROI is detected in the image captured by the standard image sensor S1430. The coding parameters are adjusted for ROI and RONI based on the event signal S1440.

Figure 15:
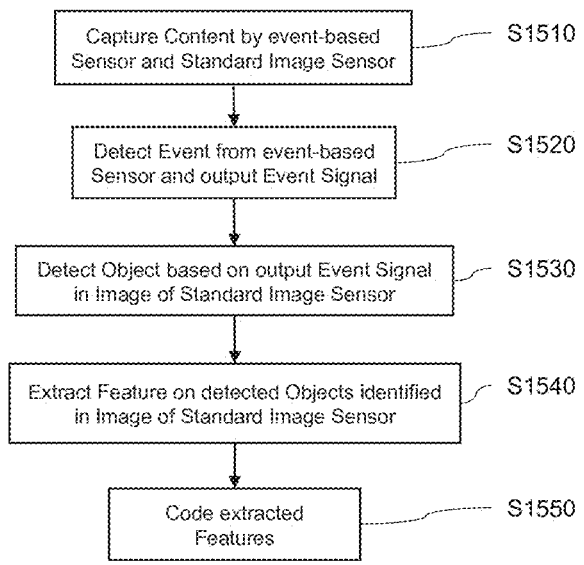
FIG. 15 is a flowchart of a related method of an embodiment for event-based object detection and subsequent object feature extraction, and feature encoding.

According to an exemplary embodiment of FIG. 15, content of a real picture is captured by an event-based sensor and standard image sensor S1510. An event from the event-based sensor is detected and the respective event signal is output S1520. Based on the event signal, an object is detected in the image of the standard image sensor S1530. A feature of the detected object, identified in the image of the standard image sensor, is extracted S1540, and the extracted feature is coded S1550.

According to an embodiment, a computer-readable non-transitory medium stores a program, including instructions which when executed on a processor cause the processor to perform the steps of the method.

The embodiments exploit event-signals, provided by event-triggered sensors, to perform motion analysis (e.g. in terms of motion statistics) and object detection for an image taken by a standard image sensor. This allows to reliably and accurately detect fast moving objects of different sizes, and adjust temporal and spatial coding parameters (including quantization parameter QP) used for encoding the video image. Injunction with the event-based detection of ROI and RONI in the video image, any of the coding parameters may be adapted and fine-tuned in accordance with image events, i.e. the dynamic changes occurring in the video image.

As a result, the embodiments enable the adaptation of the coding complexity for a region, such as ROI and/or RONI, within the video image and/or one of its frames. This improves the coding efficiency e.g. in terms of coding bandwidth adaptation, in automated computer-vision algorithms and apparatuses for machine vision applications, including image encoding/coding with optimal coding parameters.

Thus, the approach disclosed by the embodiments provides the advantageous effects of a more accurate background extraction and object detection (including object identification), as relevant for video surveillance, computer-vision driven video (en)coding, or autonomous driving.

The approach disclosed by the embodiments may be used and implemented on chips (e.g. IPC camera chips), in surveillance cameras, or other consumer devices with cameras having object-detection functionality.

Summarizing, the present disclosure relates to encoding of video image using coding parameters, which are adapted based on events related to motion within the video image. Image content is captured by a standard image sensor and an event-triggered sensor, providing an event-signal indicating changes (e.g. amount and time-spatial location) of image intensity. Objects are detected within the video image, based on the event signal assessing motion of the object, and their textures extracted. The spatial-time coding parameters of the video image are determined based on the location and strength of the event signal, and the extent to which the detected objects moves. The use of event signals in conjunction with texture information of the object allows to perform segmentation of the video image from the background and thus to optimize further the coding of background and dynamic image content, including fast and slow moving objects of different sizes.

LIST OF REFERENCE SIGNS

FIG. 1
100 Encoder
103 Picture block
102 Input (e.g. input port, input interface)
104 Residual calculation [unit or step]
105 Residual block
106 Transformation (e.g. additionally comprising scaling) [unit or step]
107 Transformed coefficients
108 Quantization [unit or step]
109 Quantized coefficients
110 Inverse quantization [unit or step]
111 De-quantized coefficients
112 Inverse transformation (e.g. additionally comprising scaling) [unit or step]
113 Inverse transformed block
114 Reconstruction [unit or step]
115 Reconstructed block
116 (Line) buffer [unit or step]
117 Reference samples
120 Loop filter [unit or step]
121 Filtered block
130 Decoded picture buffer (DPB) [unit or step]
142 Inter estimation (or inter picture estimation) [unit or step]

143 Inter estimation parameters (e.g. reference picture/reference picture index, motion vector/offset)
144 Inter prediction (or inter picture prediction) [unit or step]
145 Inter prediction block
152 Intra estimation (or intra picture estimation) [unit or step]
153 Intra prediction parameters (e.g. intra prediction mode)
154 Intra prediction (intra frame/picture prediction) [unit or step]
155 Intra prediction block
162 Mode selection [unit or step]
165 Prediction block (either inter prediction block 145 or intra prediction block 155)
170 Entropy encoding [unit or step]
171 Encoded picture data (e.g. bitstream)
172 Output (output port, output interface)
231 Decoded picture
FIG. 2
200 Decoder
171 Encoded picture data (e.g. bitstream)
202 Input (port/interface)
204 Entropy decoding
209 Quantized coefficients
210 Inverse quantization
211 De-quantized coefficients
212 Inverse transformation (scaling)
213 Inverse transformed block
214 Reconstruction (unit)
215 Reconstructed block
216 (Line) buffer
217 Reference samples
220 Loop filter (in loop filter)
221 Filtered block
230 Decoded picture buffer (DPB)
231 Decoded picture
232 Output (port/interface)
244 Inter prediction (inter frame/picture prediction)
245 Inter prediction block
254 Intra prediction (intra frame/picture prediction)
255 Intra prediction block
260 Mode selection
265 Prediction block (inter prediction block 245 or intra prediction block 255)
FIG. 3
300 Coding system
310 Source device
312 Picture Source
313 (Raw) picture data
314 Pre-processor/Pre-processing unit
315 Pre-processed picture data
318 Communication unit/interface
320 Destination device
322 Communication unit/interface
326 Post-processor/Post-processing unit
327 Post-processed picture data
328 Display device/unit
330 transmitted/received/communicated (encoded) picture data
FIG. 4
400 Video coding device
410 Ingress ports
420 Receiver units (Rx)
430 Central processing unit (CPU)
440 Transmitter units
450 Egress ports
460 Memory
470 Coding module
FIG. 7
710 lens 1 and lens 2
720 event driven sensor
730 RGB sensor
740 fusion
FIG. 8
850 lens
860 filter
870 RGB and event-driven sensor
880 fusion
FIG. 9A
910 standard image sensor
920 event-driven sensor
930 preprocessing
940 registration
950 fusion
960 extract feature from object
FIG. 9B
910 standard image sensor
920 event-driven sensor
930 preprocessing
940 registration
950 fusion
960 extract feature from object
FIG. 9C
910 standard image sensor
920 event-driven sensor
930 preprocessing
970 detected event/object
FIG. 10
1010 event-driven sensor output
1012 person
1014 car
1020 standard image sensor output
1022 person
1024 car
FIG. 11
1110 event image video
1120 real image video
1130 event-based motion information
1140 coding parameter+encoding
FIG. 12
1210 video encoder
1220 motion analyzer
1230 ROI-RONI detector
1240 frame rate adaptation
1250 picture size adaptation
FIG. 11
S1310 content capture be event-based sensor and standard image sensor
S1320 event detection from event-based sensor and output event signal
S1330 detect object based on event signal and calculate motion information based on event signal
S1340 check if object is detected: YES/NO?
S1350 YES: decrease temporal and/or spatial resolution of standard image sensor
S1352 encode adjusted video image
S1360 NO: increase temporal and/or spatial resolution of standard image sensor
S1362 encode adjusted video image
FIG. 14
S1410 content capture be event-based sensor and standard image sensor
S1420 event detection from event-based sensor and output event signal S1430 Detect ROI in Image of Standard Image Sensor based on the output Event Signal
S1440 Adjust Coding Parameters for ROI and non-ROI Region
FIG. 15
S1510 content capture be event-based sensor and standard image sensor
S1520 event detection from event-based sensor and output event signal
S1530 Detect Object based on output Event Signal in Image of Standard Image Sensor
S1540 Extract Feature on detected Objects identified in Image of Standard Image Sensor
S1550 Code extracted Features

What is claimed is:

1. An apparatus, comprising
at least one processor; and
a non-transitory memory storing computer executable instructions for execution by the at least one processor, wherein the computer executable instructions instruct the at least one processor to:
obtain a video image from an image sensor;
obtain, from an event-triggered sensor, an event signal of a plurality of event signals indicating a location in the video image associated with an image intensity change in event image data from the event-triggered sensor;
detect, according to the location, an object at the location, in the video image, corresponding to the image intensity change of the event image data;
extract, from the video image obtained from the image sensor, a feature of the detected object;
determine, based on the event signal, a region of interest (ROI) and a region of non-interest (RONI) within the video image by detecting the ROI and the RONI by:
comparing, for each of the plurality of event signals, an absolute value of an image intensity change indicated by the respective event signal with a second predefined threshold;
setting a first value of a first event signal to one in response to an absolute value corresponding to the first event signal of the plurality of event signals being equal to or larger than the second predefined threshold;
setting a second value of a second event signal to zero in response to an absolute value corresponding to the second event signal of the plurality of event signals being less than the second predefined threshold;
associating the value one with the ROI, and the value zero with the RONI; and
marking, in correspondence to a location of an image intensity change indicated by the first event signal, and based on the value one of the first event signal, a sample of the video image as part of an object;
determine a coding parameter for encoding the video image according to the event signal by determining, for the ROI and the RONI, a respective coding parameter for coding samples of the video image within the ROI or the RONI; and
encode at least the feature of the detected object of the video image by applying the coding parameter, wherein encoding the at least the feature of the detected object comprises encoding the samples within the ROI and the RONI by applying the respective coding parameters, wherein encoding the sample comprises encoding the ROI and the RONI, wherein the ROI and the RONI correspond to a ROI-RONI bitmap having bits per unit, and the units of the ROI-RONI bitmap correspond to one or more samples.

2. The apparatus according to claim 1, wherein the event signal further indicates, for the location of the image intensity change, an amount of the image intensity change, and wherein the computer executable instructions further instruct the at least one processor to:
calculate motion information of the image using a metric of the image intensity change.

3. The apparatus according to claim 2, wherein an object is detected within the video image based on the motion information and a detected region of interest (ROI), by mapping a ROI-region of non-interest (RONI) bitmap onto the video image, to match locations of samples of the video image.

4. The apparatus according to claim 2, wherein a coding parameter (QP) for a coding block of the video image, is determined by:
decreasing the QP when a part or an entire coding block is within a region of interest (ROI) or an object is detected; and
increasing the QP when the coding block is within a region of non-interest (RONI).

5. The apparatus according to claim 1, wherein the computer executable instructions further instruct the at least one processor to:
determine, based on the event signal, motion information, wherein the motion information indicates motion of an object in the video image; and
wherein the computer executable instructions that instruct the at least one processor to detect the object at the location, in the video image, corresponding to the image intensity change of the event image data include computer executable instructions that instruct the at least one processor to detect, based on the motion information, the object at the location in the video image of the image intensity change.

6. The apparatus according to claim 5, wherein the object is detected when the motion information has a value that is equal to or larger than a first predetermined threshold.

7. The apparatus according to claim 5, wherein the computer executable instructions that instruct the at least one processor to determine a coding parameter for encoding the video image according to the event signal include computer executable instructions that instruct the at least one processor to:
determine a coding parameter according to the feature.

8. The apparatus according to claim 1, wherein the computer executable instructions that instruct the at least one processor to determine the coding parameter comprise instructions that instruct the at least one processor to:
determine the coding parameter according to motion information of the video image or a detected object in the video image, wherein the coding parameter is related to time resolution of the video image or spatial resolution of the video image.

9. The apparatus according to claim 1, wherein the computer executable instructions further instruct the at least one processor to:
when an object is detected in the video image that is determined to be moving with a speed at or below a predetermined speed threshold, retain a frame rate and picture size to default values;

when an object is detected in the video image that is determined to be moving with a speed larger than a predetermined speed threshold, increase a frame rate with reference to a default value; and when no object is detected in the video image, decrease a frame rate and a picture size from default values.

10. The apparatus according to claim 1, wherein the location of the intensity change is mapped onto a location of a sample corresponding to a coordinate of the sample in the video image.

11. A method, comprising
obtaining a video image from an image sensor;
obtaining, from an event-triggered sensor, an event signal of a plurality of event signals indicating a location in the video image associated with an image intensity change in in event image data from the event-triggered sensor;
detecting, according to the location, an object at the location, in the video image, corresponding to the image intensity change of the event image data;
extracting, from the video image obtained from the image sensor, a feature of the detected object;
determining, based on the event signal, a region of interest (ROI) and a region of non-interest (RONI) within the video image by detecting the ROI and the RONI by:
  comparing, for each of the plurality of event signals, an absolute value of an image intensity change indicated by the respective event signal with a second predefined threshold;
  setting a first value of a first event signal to one in response to an absolute value corresponding to the first event signal of the plurality of event signals being equal to or larger than the second predefined threshold;
  setting a second value of a second event signal to zero in response to an absolute value corresponding to the second event signal of the plurality of event signals being less than the second predefined threshold;
  associating the value one with the ROI, and the value zero with the RONI; and
  marking, in correspondence to a location of an image intensity change indicated by the first event signal, and based on the value one of the first event signal, a sample of the video image as part of an object;
determining a coding parameter for encoding the video image according to the event signal by determining, for the ROI and the RONI, a respective coding parameter for coding samples of the video image within the ROI or the RONI; and
encoding at least the feature of the detected object of the video image by applying the coding parameter, wherein encoding the at least the feature of the detected object comprises encoding the samples within the ROI and the ROM by applying the respective coding parameters, wherein encoding the sample comprises encoding the ROI and the RONI, wherein the ROI and the RONI correspond to a ROI-RONI bitmap having bits per unit, and the units of the ROI-RONI bitmap correspond to one or more samples.

12. The method according to claim 11, wherein the event signal further indicates, for the location of the image intensity change, an amount of the image intensity change, wherein motion information of the video image is calculated using a metric of the image intensity change.

13. The method according to claim 12, wherein a coding parameter (QP) for a coding block of the video image, is determined by:

decreasing the QP when a part or an entire coding block is within a region of interest (ROI) or an object is detected in the video image; and
increasing the QP when the coding block is within a region of non-interest (RONI).

14. The method according to claim 11, further comprising:
determining, based on the event signal, motion information, wherein the motion indicates motion of an object in the video image; and
detecting, based on the motion information, an object at a location within the video image that corresponds to the location of the image intensity change.

15. The method according to claim 11, further comprising:
retaining, when an object is detected in the video image that is determined to be moving with a speed at or below a predetermined speed threshold, a frame rate and a picture size to default values;
increasing, when an object is detected in the video image that is determined to be moving with a speed larger than a predetermined speed threshold, a frame rate with reference to a default value; and
decreasing, when no object is detected in the video image, a frame rate and a picture size from default values.

16. A computer-readable non-transitory medium storing a program, including instructions which, when executed on a processor, cause the processor to:
obtain a video image from an image sensor;
obtain, from an event-triggered sensor, an event signal of a plurality of event signals indicating a location in the video image associated with an image intensity change in event image data from the event-triggered sensor;
detect, according to the location, an object at the location, in the video image, corresponding to the image intensity change of the event image data;
extract, from the video image obtained from the image sensor, a feature of the detected object;
determining, based on the event signal, a region of interest (ROI) and a region of non-interest (RONI) within the video image by detecting the ROI and the RONI by:
  comparing, for each of the plurality of event signals, an absolute value of an image intensity change indicated by the respective event signal with a second predefined threshold;
  setting a first value of a first event signal to one in response to an absolute value corresponding to the first event signal of the plurality of event signals being equal to or larger than the second predefined threshold;
  setting a second value of a second event signal to zero in response to an absolute value corresponding to the second event signal of the plurality of event signals being less than the second predefined threshold;
  associating the value one with the ROI, and the value zero with the RONI; and
  marking, in correspondence to a location of an image intensity change indicated by the first event signal, and based on the value one of the first event signal, a sample of the video image as part of an object;
determine a coding parameter for encoding the video image according to the event signal by determining, for the ROI and the RONI, a respective coding parameter for coding samples of the video image within the ROI or the RONI; and
encoding at least the feature of the detected object of the video image by applying the coding parameter, wherein encoding the at least the feature of the detected object comprises encoding the samples within the ROI and the RONI by applying the respective coding parameters, wherein encoding the sample comprises encoding the ROI and the RONI, wherein the ROI and the RONI correspond to a ROI-RONI bitmap having bits per unit, and the units of the ROI-RONI bitmap correspond to one or more samples.

\* \* \* \* \*

UNITED STATES PATENT AND TRADEMARK OFFICE
CERTIFICATE OF CORRECTION

PATENT NO. : 11,490,092 B2
APPLICATION NO. : 17/170122
DATED : November 1, 2022
INVENTOR(S) : Zhijie Zhao Page 1 of 1

It is certified that error appears in the above-identified patent and that said Letters Patent is hereby corrected as shown below:

In the Claims

Claim 11, Column 37, Line 54; delete "ROM" and insert --RONI--.

Signed and Sealed this
Twenty-ninth Day of November, 2022

Katherine Kelly Vidal
*Director of the United States Patent and Trademark Office*